United States Patent
Leser et al.

(10) Patent No.: US 10,645,957 B2
(45) Date of Patent: May 12, 2020

(54) OIL FILLER COMPOSITIONS AND USES THEREOF

(71) Applicant: NESTEC S.A., Vevey (CH)

(72) Inventors: Martin Leser, Bretigny-sur-Morrens (CH); Christoph Reh, Epalinges (CH); Stephan Palzer, Lausanne (CH); Lennart Fries, Lausanne (CH); Gerhand Niederreiter, Savigny (CH); Cecile Gehin-Delval, Les Hopitaux Neufs (FR); Christine Haider, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 311 days.

(21) Appl. No.: 15/538,539

(22) PCT Filed: Dec. 17, 2015

(86) PCT No.: PCT/EP2015/080290
§ 371 (c)(1),
(2) Date: Jun. 21, 2017

(87) PCT Pub. No.: WO2016/102315
PCT Pub. Date: Jun. 30, 2016

(65) Prior Publication Data
US 2018/0000134 A1    Jan. 4, 2018

(30) Foreign Application Priority Data
Dec. 22, 2014    (EP) .................................... 14199896

(51) Int. Cl.
*A23L 2/66*    (2006.01)
*A23D 7/005*    (2006.01)
(Continued)

(52) U.S. Cl.
CPC .................. *A23L 2/66* (2013.01); *A21D 2/16* (2013.01); *A21D 2/26* (2013.01); *A21D 2/36* (2013.01);
(Continued)

(58) Field of Classification Search
CPC ... A23L 2/66; A23L 2/62; A23L 29/10; A23L 29/20; A23L 29/294; A23L 33/20;
(Continued)

(56) References Cited

U.S. PATENT DOCUMENTS

| 4,933,192 A | 6/1990 | Darling et al. |
| 5,234,704 A * | 8/1993 | Devine .................... A23G 9/42 426/565 |

(Continued)

FOREIGN PATENT DOCUMENTS

| DE | 102007057258 | 6/2009 |
| WO | WO2004056187 | * 7/2011 |

OTHER PUBLICATIONS

Peng et al, Effect of fortification with various types of milk proteins on the rheological properties and permeability of nonfat set yogurt. J Food Sci. Nov.-Dec. 2009; 74(9):10.111/j.1750-3841.2009.01350 (Year: 2009).*

(Continued)

*Primary Examiner* — Cephia D Toomer
(74) *Attorney, Agent, or Firm* — K&L Gates LLP

(57) ABSTRACT

The present invention relates to processes for providing oil-filler compounds (OFC) compositions with enhanced taste and/or aromas. In particular the present invention relates to beverages containing micronized OFC particles. The present invention relates to the use of OFC in creamers, beverage powders, ready-to-drink liquid beverage preparations, or beverage capsules suitable for the production of a beverage.

16 Claims, 15 Drawing Sheets

(51) Int. Cl.

| | |
|---|---|
| *A21D 2/26* | (2006.01) |
| *A21D 2/36* | (2006.01) |
| *A23L 29/10* | (2016.01) |
| *A23L 2/395* | (2006.01) |
| *A23C 11/00* | (2006.01) |
| *A23L 2/62* | (2006.01) |
| *A23L 33/21* | (2016.01) |
| *A21D 2/16* | (2006.01) |
| *A23L 33/22* | (2016.01) |
| *A23L 33/20* | (2016.01) |
| *A23L 29/20* | (2016.01) |
| *A23L 29/294* | (2016.01) |
| *A23C 11/04* | (2006.01) |

(52) U.S. Cl.
CPC .............. *A23C 11/00* (2013.01); *A23C 11/04* (2013.01); *A23D 7/0053* (2013.01); *A23L 2/395* (2013.01); *A23L 2/62* (2013.01); *A23L 29/10* (2016.08); *A23L 29/20* (2016.08); *A23L 29/294* (2016.08); *A23L 33/20* (2016.08); *A23L 33/21* (2016.08); *A23L 33/22* (2016.08); *A23V 2002/00* (2013.01)

(58) Field of Classification Search
CPC .......... A23L 33/21; A23L 33/22; A23L 2/395; A23D 7/0053; A21D 2/16; A21D 2/26; A21D 2/36; A23C 11/00; A23C 11/04; A23V 2002/00
See application file for complete search history.

(56) References Cited

U.S. PATENT DOCUMENTS

2003/0215546 A1  11/2003  Aguilar et al.
2007/0128331 A1  6/2007  Kvist et al.

OTHER PUBLICATIONS

Kokini et al. "Effect of Tomato Paste on Rheological Properties and Particle Size Distribution of Model Oil-in-Water Emulsions" Journal of Food Science, 1989, vol. 54, No. 2, pp. 437-439.
Patent Abstracts of Japan—Application No. JP20070006465, 1 page, XP002739586, 2007.
Patent Abstracts of Japan—Application No. JP20020552418, 1 page, XP002739587, 2002.

* cited by examiner

A.

B.

OIL FILLER COMPOSITIONS AND USES THEREOF

CROSS REFERENCE TO RELATED APPLICATIONS

The present application is a National Stage of International Application No. PCT/EP2015/080290, filed on Dec. 17, 2015, which claims priority to European Patent Application No. 14199896.3, filed on Dec. 22, 2014, the entire contents of which are being incorporated herein by reference.

TECHNICAL FIELD OF THE INVENTION

The present invention relates to processes for providing oil-filler compounds (OFC) compositions and uses thereof. In particular the present invention relates to beverages containing micronized OFC particles.

The present invention relates to the use of OFC in creamers, beverage powders, ready-to-drink liquid beverage preparations, or beverage capsules suitable for the production of a beverage.

BACKGROUND OF THE INVENTION

The present disclosure generally relates to a nutritional product. More specifically, the present disclosure is directed to ready to drink ("RTD") beverages comprising a low calorie content.

Consumers are often looking for health conscious beverages with less calories without compromising the taste and texture. In addition, consumers are looking for enhanced mouthfeel, also denoted as richness, texture or creaminess, of the beverages. Thus, many RTD beverages are transitioning from high fat and high sugar versions to versions with less fat and less sugar to limit the calories in the beverage. However, fat and sugar reduction results in a less pleasing mouthfeel of the beverages. Thus by reducing fat in the recipe, the described creaminess is partially lost, which is perceived as watery, thin, weak, diluted and low quality by consumers.

Therefore, there is a need for a solution that provides an enhanced mouthfeel of low fat and low sugar RTD beverages so that the consumer has an increased perception of the texture of the beverage.

At the same time, when improving texture perception of low fat and reduced sugar RTD beverages, the long shelf life stability of the beverage cannot be compromised. Reduction in beverage calories requires reduction of fat and/or sugar. However, fat and/or sugar reduction results in a loss of texture/mouthfeel of the beverages. In order to increase beverage texture perception there is a need of solution(s) that allows enhancing texture/mouthfeel of low fat/low sugar RTD beverages.

Such stability is challenging because ingredients added to the beverage to improve mouthfeel typically cause a deterioration of the product quality, such as undesirable increase of product viscosity and phase separation, e.g. gelation, syneresis, layering, creaming and/or sedimentation.

US20030215546 relates to edible emulsion comprising live micro-organisms. US20070128331 relates to emulgating agent from cereal grains. DE102007057258 discloses a process for preparing a oil-on-water emulsion useful for the production of bio-foods, preferably bio-beverage, comprises a flavoring oil phase containing bound polysaccharide, and an aqueous protein containing phase. JP2008167723 relates to a method for producing the liquid seasoning containing the sesame, an aqueous phase and an oil phase includes mixing the sesame with other raw materials after pulverizing the sesame in the oil phase. WO02051262 relates to process for producing water and fat-containing food. U.S. Pat. No. 4,933,192 relates to hydratable powders which form emulsions.

Prior art references use essential oils, such as thyme oil, that are much more soluble in water than triglycerides. In Reference Khalid Ziani, Yuhua Chang, Lynne McLandsborough, and David Julian McClements, J. Agric. Food Chem. 2011, 59, 6247-6255, it is mentioned that Thyme oil (Tymol) has a relatively high solubility in water (1 g/L), whereas in Noriaki Funasaki, Sakae Hada, Keizo Suzuki; Chem. Pharm. Bull 1976, 24 (4) 731-735 it is mentioned that Triglycerides are almost not soluble in water: solubility 10-6M-10-8M; i.e, solubility is less lower than 8.9 10-5 g/L, i.e. much lower than the essential oils.

The majority of existing solutions with indulgent mouthfeel have high calorie. There are limited solutions for low fat (non-fat)/low sugar shelf stable RTD beverages which have texture/mouthfeel similar to that of high fat/high sugar beverages. On the other hand, some existing, low calories versions are lacking in indulgent, thick, creamy texture. On the other hand, additives are usually added to modulate the mouthfeel of products, especially in the low fat variants. Specific formulations are sold as "mouthfeel flavor" ingredients, but their sensory impact is limited. Some of these ingredients used are hydrocolloids such as starch, xanthan or carrageenan or other hydrocolloids to increase the viscosity of the beverage. However, the introduced change of texture cannot mimic or even replace the creaminess perception offered by lipids. Often a jelly-like texture is perceived as artificial or chemical by the consumer. Many additives suffer additionally from poor water solubility. Therefore, the amount of additive that can be introduced into a low fat beverage composition is limited in order not to hamper reconstitution or the homogeneity of the RTD product.

Therefore, there is a need for low calories RTD beverages that have creamy, thick texture/mouthfeel but without compromising physical stability and taste profile during shelf-life.

SUMMARY OF THE INVENTION

A Ready-To-Drink (RTD), powdered beverage, powder creamer or liquid creamer comprising an oil filler (OFC) component that is mixed with oil during production of the beverage and then the oil and oil filler mixture may be wet ground to achieve the desired particle size of oil filler particles and to ensure proper dispersion into the oil phase. The oil and micronized oil filler mixture is then used to produce the beverage composition with food aroma as conventionally for producing a powdered or liquid beverage.

Thus, an object of the present invention relates to processes for providing oil filler compositions with improved nutritional profiles.

In particular, it is an object of the present invention to provide OFC compounds that solves the above mentioned problems of the prior art with fat reduction, sedimentation and solubility.

Thus, one aspect of the invention relates to a process for providing an OFC composition, the process comprising a)) mixing in a first mixing step an oil component with oil-filler compounds (OFC) and grinding the OFC in oil thereby providing a first composition comprising micronized OFC particles with an average particle size below 100 micrometers (μm) incorporated in the oil component, wherein the OFC are low calorific substances comprising dietary fibers, hydrocolloids and/or inorganic salts;

b) providing an aqueous component comprising milk proteins, plant proteins or combinations thereof thereby providing a second composition;

c) mixing in a second mixing step the first composition with the second composition and d) homogenising the composition thereby providing an oil-in-water emulsion.

Another aspect of the present invention relates to an oil-in-water emulsified OFC composition obtainable by the above mentioned process.

Further aspects of the present invention relate to uses of the OFC compositions of the invention, food ingredients and food products comprising the OFC compositions.

The present invention will now be described in more detail in the following.

Sample A corresponds to the current invention (spent coffee grounds micronized in oil).

Sample B refers to the reference, obtained by dry mixing of milled spent coffee grounds into the creamer preparation. Despite having the same fat and spent coffee grounds content, the sample of the invention delivers a homogeneously dark brown coloured liquid with the micronized spent coffee grounds being incorporated into a stable emulsion of oil droplets. The sensoric experience is enhanced since a fuller body and mouthfeel is perceived in comparison to the reference.

In the reference sample, the micronized spent coffee grounds agglomerate and form lumps. As a result, an immediate sedimentation is observed and the optical appearance and sensoric attributes of the beverage are compromised, i.e. it is light brown in colour with irregular dark lumps and no positive effect on the texture is achieved.

The use of a compound based on the invention is to deliver coffee compositions in which coffee is mixed with spent coffee grounds. Based on this, an unexpected sweet and malty flavor is created in the coffee recipe.

Figure 14:
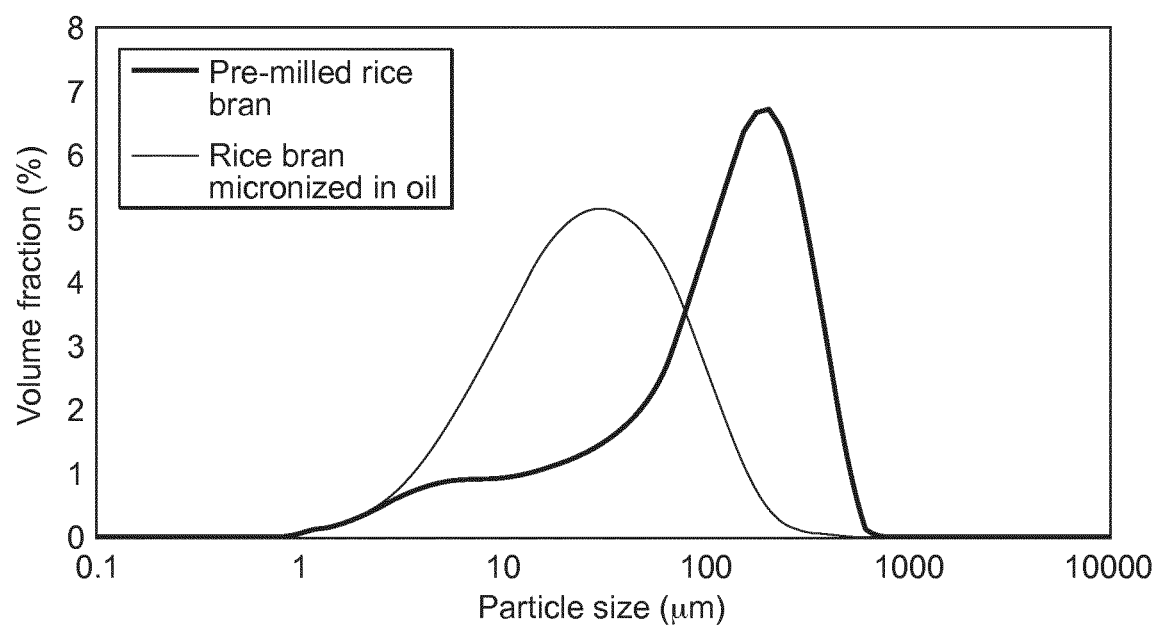

FIG. 14 shows particle size distribution of rice bran particles micronized in oil as described in below example 6.

DETAILED DESCRIPTION OF THE INVENTION

As mentioned above, the present invention relates to process for providing OFC compositions with improved solubility and having an enhanced taste and/or aroma profile. Thus, an aspect of the present invention relates to a process for providing a OFC composition, the process comprising
a) mixing in a first mixing step an oil component with OFC and grinding the OFC in oil thereby providing a first composition comprising micronized OFC incorporated in the oil component;
b) providing an aqueous component comprising milk proteins, plant proteins or combinations thereof thereby providing a second composition,
c) mixing in a second mixing step the first composition with the second composition and
d) homogenising the composition thereby providing an oil-in-water emulsion.

The term "Oil-filler compounds (OFC)" refers to substances that are of low calorific value and such substances can be incorporated in an oil droplet. This system allows exchange of oil molecules with non lipidic material without reducing the effective volume of the total lipid phase. Micronization in oil of these substances aids in entrapment of these OFC in oil droplets. It provides a better stable beverage which has less fat content and provides an enhanced mouthfeel. OFC substances include dietary fibers, hydrocolloids and/or inorganic salts.

The term "dietary fibers" relates to compounds that are insoluble in water and are rich in fibers. These fibers are micronized in the oil phase and suspended in the oil. Resistant dextrins, beta glucan, inulin, date pits, bran (wheat, oat, corn, rice), citrus fibres, rice protein, spent coffee grounds nut shells, acacia fiber, cereals (whole wheat, barley, oat, rice, couscous, bulgur, corn), vegetable skins, beans (white, black, kidney, chickpeas), pulses (lentils, peas), lignin, cellulose, glucomanan, sprouts (bamboo, soy,), resistant starches, chicorée, fructo-oligo-saccharides, Micro crystalline cellulose.

Examples of inorganic salts include $CaCO_3$, $SiO_2$, $TiO_2$.

The term "hydrocolloids" relates to compounds that help to improve physical stability of the composition. Suitable hydrocolloids may e.g. be carrageenan, such as kappa-carrageenan, iota-carrageenan, and/or lambda-carrageenan; starch, e.g. modified starch; cellulose, e.g. microcrystalline cellulose, methyl cellulose, or carboxy-methyl cellulose; agar-agar; gelatine; gellan (e.g., high acyl, low acyl); guar gum; gum Arabic; kojac; locust bean gum; pectin; sodium alginate; maltodextrin; tracaganth; xanthan; or a combination thereof.

Reducing the fat without reducing its impact on mouthfeel is achieved by increasing the volume of the fat phase in the beverage by adding insoluble 'space filling' components to the oil phase. Examples are fibrous compounds that are insoluble in water such as inulin, bran, citrus fibres, rice protein, peanut skins. In order to disperse them into the oil phase they are micronized into a base oil or fat like palm kernel oil, coconut oil, palm oil, peanut oil, sunflower oil or others. Intense mixing, shearing and milling of fibrous particles in oil create oil-covered micro particles that act like oil droplets when dispersed in water or enhance the effective volume of the 'fat component' in the product. By these means 25-70% of the mass of the oil is replaced by fibrous particles or OFC in the beverage or creamer preparation. Hence, the oil content of the beverage or creamer preparation can be reduced without compromising on mouthfeel and creaminess perception that is associated with the effective volume of the fat phase.

In one embodiment the process comprises further steps of: adding a bulking and/or sweetener agent(s) to the oil-in-water emulsion; and pasteurizing or commercially sterilizing the oil-in-water emulsion. The bulking agent comprises maltodextrin and the sweetener agent comprises sugar, and/or combination of carbohydrates.

In another embodiment, the process comprises further steps of HTST or UHT using either direct or indirect process; and Filled on a clean fill, ultra clean fill (ESL) or aseptic filler.

In one embodiment the aqueous component is a dairy component and can include one or more dairy ingredients or dairy substitute ingredients. For example, the dairy ingredients can be milk, milk fat, milk powder, skim milk, milk proteins and combinations thereof. Examples of suitable dairy proteins are casein, caseinate, casein hydrolysate, whey, whey hydro lysate, whey concentrate, whey isolate, milk protein concentrate, milk protein isolate, and combinations thereof. Furthermore, the dairy protein may be, for example, sweet whey, acid whey, α-lactalbumin, β-lactoglobulin, bovine serum albumin, acid casein, caseinates, α-casein, β-casein and/or γ-casein. Suitable dairy substitute ingredients include plant proteins such as soy proteins, rice proteins, almond proteins, peanut proteins and combinations thereof, for example. In an embodiment, milk fat is present in the beverage in an amount from about 0% to about 1.5% of the beverage.

The order of mixing the different components may vary. Preferably, the oil phase and an aqueous phase are prepared separately. Emulsifiers are usually mixed into the oil but may also be added to the aqueous phase. Protein and other milk proteins such as creamer components are dissolved in the aqueous phase. The two phases are then mixed and homogenized to produce an emulsion, which can be used in liquid form or dried. The OFC particles may be incorporated into (and milled in) only a part of the oil and additional oil may be added afterwards. Thus, in an embodiment one or more further oil components are added after step d), such as before pasteurization and/or drying.

The OFC particles are preferably micronized after addition to the oil (e.g. by milling), but the OFC particles may also be provided to the oil in a micronized form.

Emulsifiers are preferably added to the first composition in step a), but it may also be added in other steps. Thus, in an embodiment the one or more emulsifiers are added
to the first composition in step a); and/or
to the aqueous component in step b); and/or
during the mixing step c); and/or
during the homogenisation step d).

The OFC composition of the invention may comprise low molecular weight emulsifiers. By a low molecular weight emulsifier is meant an emulsifier with a molecular weight below 1500 g/mol. Emulsions are thermodynamically unstable, and the phases of an emulsion will separate with time. By an emulsifier is meant a compound that stabilises the interface between the two phases of the oil-in-water emulsion and reduces the rate of phase separation. In an embodiment the emulsifiers are selected from the group consisting monoglycerides, diglycerides, acetylated monoglycerides, sorbitan trioleate, glycerol dioleate, sorbitan tristearate, propyleneglycol monostearate, glycerol monooleate and monostearate, sorbitan monooleate, propylene glycol mono laurate, sorbitan monostearate, sodium stearoyl lactylate, calcium stearoyl lactylate, glycerol sorbitan monopalmitate, diacetylated tartaric acid esters of monoglycerides, lecithins, lysolecithins, succinic acid esters of mono- and/or diglycerides, lactic acid esters of mono- and/or diglycerides, lecithins, lysolecitins, proteins and sucrose esters of fatty acids, lecithin (e.g. soy lecithin, canola lecithin, sunflower lecithin, and/or safflower lecithin), lysolecithins, and combinations thereof.

The mixing step a) may be performed by different means. In an embodiment the first mixing step a) is done by milling to micronize the OFC component. In the present context the term "micronize" relates to a process wherein the particles are processed to particle sizes below 100 micrometers (μm), such as in the range 0.1-50 μm, such as in the range 1-30 μm, such as in the range 1-20 μm. Similar the term "micronized" relates to particles with an average particle size below 100 micrometers (μm), such as in the range 0.1-50 μm, such as in the range 1-20 μm, or such as in the range 1-20 μm. Milling is preferably performed in a ball mill by wet milling or dry milling. In one embodiment of the invention, the first mixing step a) is done by milling to micronize the OFC component. The milling may be for instance a roller milling of OFC in oil or melted fat or impact milling of OFC into oil.

The term "homogenizing" or "homogenized" or "homogenisation" is a unit operation using a class of processing equipment referred to as homogenizers that are geared towards reducing the size of droplets in liquid-liquid dispersions. Examples of homogenizers may include high speed blender, high pressure homogenizers, Colloid Mill, high shear dispersers, ultrasonic disruptor, membrane homogenizers. APV HTST (high temperature short time) as shown in examples below is also a homogenizer used to impose a sufficient stress to break-up the oil into fine droplets.

The oil component of step a) may be selected from different sources. In one embodiment the oil component of step a) comprises oil selected from the group consisting of palm kernel oil, canola oil, soy bean oil, sunflower oil, safflower oil, cotton seed oil, palm oil, milk fat (for instance butterfat is a triglyceride derived from fatty acids such as myristic, palmitic and oleic acids), corn oil, high oleic variants of oils such as high oleic soybean, high oleic canola, high oleic safflower, high oleic sunflower oil, and/or coconut oil. The oil is preferably present in the creamer composition in an amount of at most about 50% (weight/weight), the amount of oil in the creamer composition may e.g. be between 1% and 40% (weight/weight), such as in the range 5-40%, such as in the range 10-40, such as in the range 5-30%, or such as in the range between 10-30%. In the present context when oil is included in the weight/weight percentages the % relates to the non-water part but including oil (solid content+oils). The total amount of oil component comprising micronized OFC therein in the aqueous composition may also vary. Thus, in yet a further embodiment the aqueous composition comprises at least 5% (w/w) of the oil component comprising micronized OFC therein, such as in the range 5-50%, such as 5-40%, such as 5-30%, such as in the range 5-20%, or such as in the range 5-15%. In another embodiment the aqueous composition comprises at least 20% (w/w) of the oil component comprising micronized OFC therein. It is to be understood that these weight % includes both the oil and the micronized OFC therein. In the context of the present invention, mentioned percentages are weight/weight percentages of dry solids (on a dry matter basis) unless otherwise stated.

The process of the invention also includes the addition of a creamer component, preferably in an aqueous form. By a creamer composition/is meant a composition that is intended to be added to a food composition, such as e.g. coffee, to impart specific characteristics such as colour (e.g. whitening effect), flavour, texture, mouthfeel and/or other desired characteristics. Thus the OFC composition as provided by this invention can also be used as a creamer. The creamer component provided in step b) is in a liquid form, but the final creamer composition of the invention may be in a liquid form or in a powdered (dry) form. In the present context dried OFC is to be understood as having a moisture content below 10%, preferably below 5% or more preferably below 3% water.

The creamer component may be any ingredient or combination of ingredients useful for inclusion in a aqueous composition. Thus, in an embodiment the aqueous component of step b) comprises a protein, a hydrocolloid, a buffering agent, and/or a sweetener.

The aqueous component preferably comprises protein in the range 0.5-15%, such as 1.5-10% such as 1.5-5% preferably between about 0.1-3% protein, such as between about 0.2-2% protein, more preferably between about 0.5% (weight/weight) and about 1.5% protein.

The protein may be any suitable protein, e.g. milk protein, such as casein, caseinate, and whey protein; vegetable protein, e.g. soy and/or pea protein; and/or combinations thereof. The protein is preferably sodium caseinate. The protein in the composition may work as an emulsifier, provide texture, and/or provide whitening effect. Too low levels of protein may reduce the stability of the liquid creamer. At too high protein levels the viscosity of the product may be higher than desired and too high for liquid processing.

The aqueous component of the present invention may further include a buffering agent. The buffering agent can prevent undesired creaming or precipitation of the creamer upon addition into a hot, acidic environment such as coffee. The buffering agent can e.g. be monophosphates, diphosphates, sodium mono- and bicarbonates, potassium mono- and bicarbonates, or a combination thereof. Preferred buffers are salts such as potassium phosphate, dipotassium phosphate, potassium hydrophosphate, sodium bicarbonate, sodium citrate, sodium phosphate, disodium phosphate, sodium hydrophosphate, and sodium tripolyphosphate. The buffer may e.g. be present in an amount of about 0.1 to about 3% by weight of the creamer.

The aqueous component of the present invention may further include one or more additional ingredients such as flavors, sweeteners, colorants, antioxidants (e.g. lipid antioxidants), or a combination thereof. Sweeteners can include, for example, sucrose, fructose, dextrose, maltose, dextrin, levulose, tagatose, galactose, corn syrup solids and other natural or artificial sweeteners. Sugarless sweeteners can include, but are not limited to, sugar alcohols such as maltitol, xylitol, sorbitol, erythritol, mannitol, isomalt, lactitol, hydrogenated starch hydrolysates, and the like, alone or in combination. Usage level of the flavors, sweeteners and colorants will vary greatly and will depend on such factors as potency of the sweetener, desired sweetness of the product, level and type of flavor used and cost considerations. Combinations of sugar and/or sugarless sweeteners may be used. In one embodiment, a sweetener is present in the creamer composition of the invention at a concentration ranging from about 5-90% by weight of the total composition, such as in the range 20-90%, preferably such as 20-70%. In another embodiment, the sweetener concentration ranges from about 40% to about 60% by weight of the total composition. In a preferred embodiment the sweetener of step e) is glucose syrup.

In a preferred embodiment the aqueous component comprises sodium caseinate, dipotassium phosphate, sodium hexametaphosphate, trisodium citrate, sodium chloride and water. In yet an embodiment the aqueous component of step b) is a non-dairy creamer. When sodium caseinate is processed, it is so materially altered that both dairy scientists and government regulators no longer regard it as a true dairy substance. This is why sodium caseinate can be an ingredient in non-dairy products according to FDA's regulation.

Examples of typical aqueous compositions are presented in tables 1-3 below.

TABLE 1

Non-dairy creamers

| Ingredients (in % by weight) | Non-dairy (NDC) | | |
|---|---|---|---|
| | LOW FAT | REGULAR | HIGH FAT |
| Milk solids non-fat (SNF) | no | no | no |
| Casein/caseinate | 1.5-3.0 | 1.5-3.0 | 1.5-3.0 |
| Lactose/sweet whey | no | 110 | no |
| Glucose syrup | 80-90 | 50-60 | 40-50 |
| Milk fat | no | no | no |
| Vegetable fat | 10-20 | 30-35 | 40-45 |
| Emulsifiers | yes | yes | yes |
| Buffer salts | yes | yes | yes |
| Flavours | optional | optional | optional |
| Colorants | optional | optional | optional |
| Flowing agents | optional | optional | optional |
| Moisture | 1-3 | 1-3 | 1-3 |

TABLE 2

Filled dairy creamers

| Ingredients (in % by weight) | Filled dairy (FDC) | | |
|---|---|---|---|
| | LOW FAT | REGULAR | HIGH FAT |
| Milk solids non-fat (SNF) | 70-90 | 20-40 | 20-40 |
| Casein/caseinate | optional | optional | optional |
| Lactose/sweet whey | 0-10 | 20-40 | 20-40 |
| Glucose syrup | optional | optional | optional |
| Milk fat | no | no | no |
| Vegetable fat | 0-10 | 25-30 | 35-40 |
| Emulsifiers | no | no | no |
| Buffer salts | yes | yes | yes |
| Flavours | optional | optional | optional |
| Colorants | optional | optional | optional |
| Flowing agents | optional | optional | optional |
| Moisture | 1-3 | 1-3 | 1-3 |

TABLE 3

Full dairy creamers

| Ingredients (in % by weight) | Full dairy |
|---|---|
| Milk solids non-fat (SNF) | 30-40 |
| Casein/caseinate | optional |
| Lactose/sweet whey | 0-40 |
| Glucose syrup | no |
| Milk fat | 15-30 |
| Vegetable fat | No |
| Emulsifiers | no |
| Buffer salts | yes |
| Flavours | optional |
| Colorants | optional |

TABLE 3-continued

Full dairy creamers

| Ingredients (in % by weight) | Full dairy |
|---|---|
| Flowing agents | optional |
| Moisture | 1-3 |

The skilled person may produce other variants of creamers. Thus, the above creamer compositions are mere examples of aqueous compositions.

The process may also include a pasteurizing step. Thus, in yet another embodiment the pasteurizing step is performed at a minimum temperature of 81° C. for at least 5 seconds. The OFC composition as obtained after the pasteurizing step can be used for making RTD beverages. The process may also include a drying step. Thus, in a further embodiment the drying step is performed by spray drying, vacuum band drying, roller drying or freeze drying. The OFC composition as obtained after the drying step can be used for making creamers for use in beverage industry for example as milk additive for coffee and tea beverage. The OFC composition after dry mixing may be used to make beverage powders such a chocolate/malt beverages, coffee mixes, bakery and culinary products for retail purposes. Such OFC composition may also be used for preparation of capsules to be used in a beverage dispenser.

As previously mentioned the OFC may also be in a dried form. Therefore in yet an aspect the invention relates to an oil-in-water emulsified dry OFC composition comprising
  an oil component comprising micronized OFC incorporated therein; and
  an aqueous component, e.g. comprising sodium caseinate.

The amount of micronized OFC may also be defined in relation to the amount of oil in which it is incorporated. Thus, in another embodiment the weight/weight ratio (or ratio by weight) between the amount of micronized OFC incorporated in the oil to the amount of oil is in the range 0.01:1-2:1, such as 0.05:1-2:1, such as 0.1:1-2:1, such as 0.1:1-1:1, such as 0.4:1-1:1, such as 0.6:1-1:1, such as 0.8:1-1, or such as 1:1.

In the context of the present invention, the terms "ratio by weight" "(weight/weight)" or "weight/weight ratio" refers to the ratio between the weights of the mentioned compounds. It is to be understood that the OFC compositions of the invention may both be in a dry format (moisture content below 10%, preferably below 5%, and even more preferably below 3%) or in a liquid state.

Examples of preferred OFC compositions of the invention include:
  An OFC composition according to the invention comprising
    5-50% (w/w) of the oil component comprising micronized OFC incorporated therein, wherein the micronized OFC constitutes 2.5-70% of the total weight of the oil component comprising micronized OFC incorporated therein; and
    one or more protein components, e.g. including sodium caseinate.
  An OFC composition according to the invention comprising
    5-50% (w/w) of the oil component comprising micronized OFC incorporated therein, wherein the micronized OFC constitutes 2.5-70% of the total weight of the oil component comprising micronized OFC incorporated therein; and 10-50% (w/w) of one or more protein components, e.g. including sodium caseinate.

An OFC composition according to the invention comprising 5-50% (w/w) of the oil component comprising micronized OFC incorporated therein, wherein the micronized OFC constitutes 2.5-70% of the total weight of the oil component comprising micronized OFC incorporated therein;

10-50% (w/w) of one or more protein components, e.g. including sodium caseinate; and 10-70% (w/w) of a sugar source, such as glucose syrup.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Example 1

Process for Providing a Ready-To-Drink (RTD) Beverage

Methods

Powdered water-insoluble citrus fibres (particle size distribution given in FIG. 3A) were mixed into palm kernel oil at T=60° C. for 20 min until fully dispersed. This dispersion of citrus fibres in oil is then micronized in using a wet bead mill (Hosokawa Alpine Hydro-Mill 90 AHM, T=65° C., zirconium oxide bead 1.7/1.9 mm, 3000 RPM, TS25).

After three passages through the mill the size distribution of the micronized particles is characterized by a $d_{90.3}$ of 134 µm, i.e 90% of the mass belongs to particles with a diameter smaller than 134 micrometers. The corresponding particle size distribution is given in FIG. 3B.

In parallel skim milk (95%) and sugar (5%) were mixed and stirred in a vessel at 50° C. Both the oily and the aqueous preparation were then mixed and stirred at 50° C. The final mix was pre-heated (80° C.), subjected to UHT treatment by direct steam injection (APV-HTST at 145° C. during 5 sec), flash-cooled to 80° C. and homogenized (APV-HTST). The final liquid beverage contains 93.5% skim milk, 4% sugar, 2% fat and 0.5% micronized citrus fibres.

Figure 3:
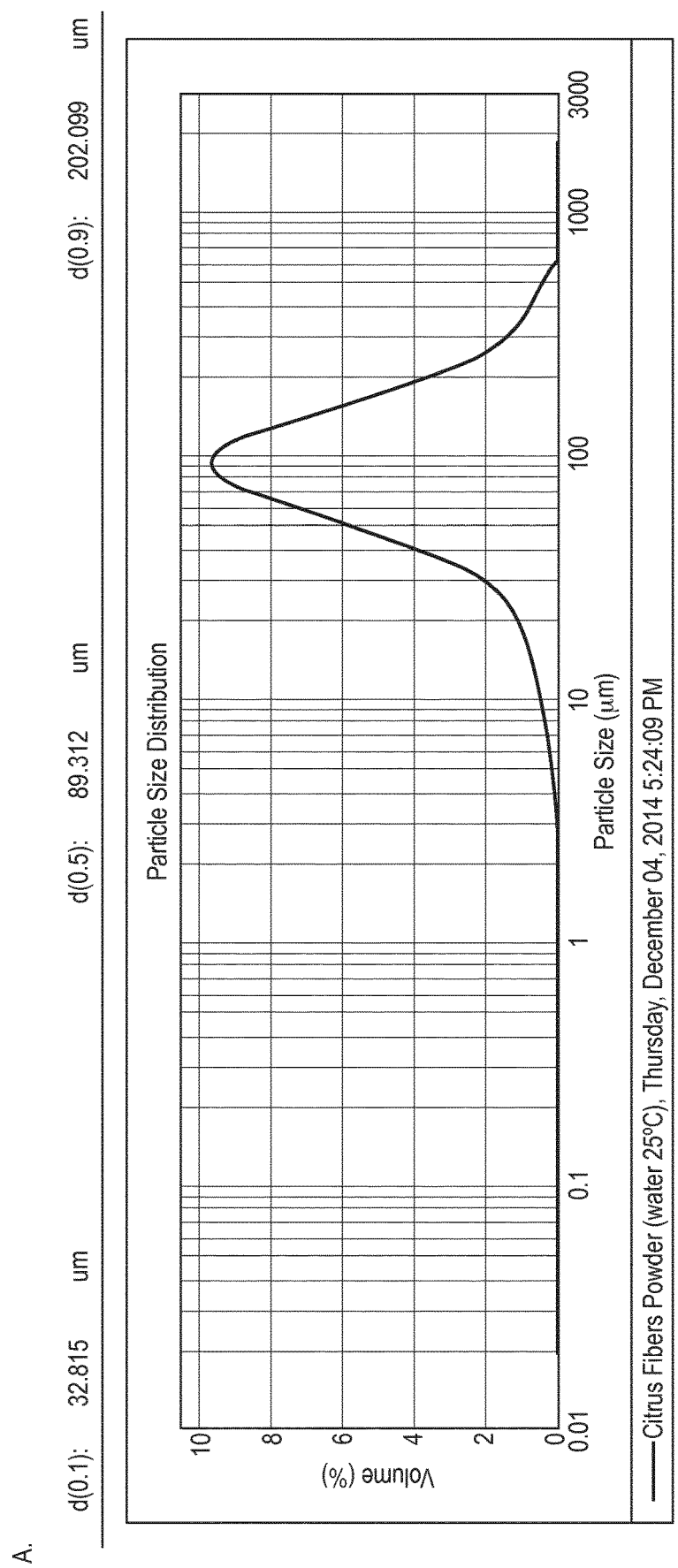
FIG. 3 shows the particle size distribution of powdered water-insoluble citrus fibres (A: dry milled powder, B: micronized citrus fibres suspended in palm kernel oil after two passages through the wet bead mill).
Figure 3:
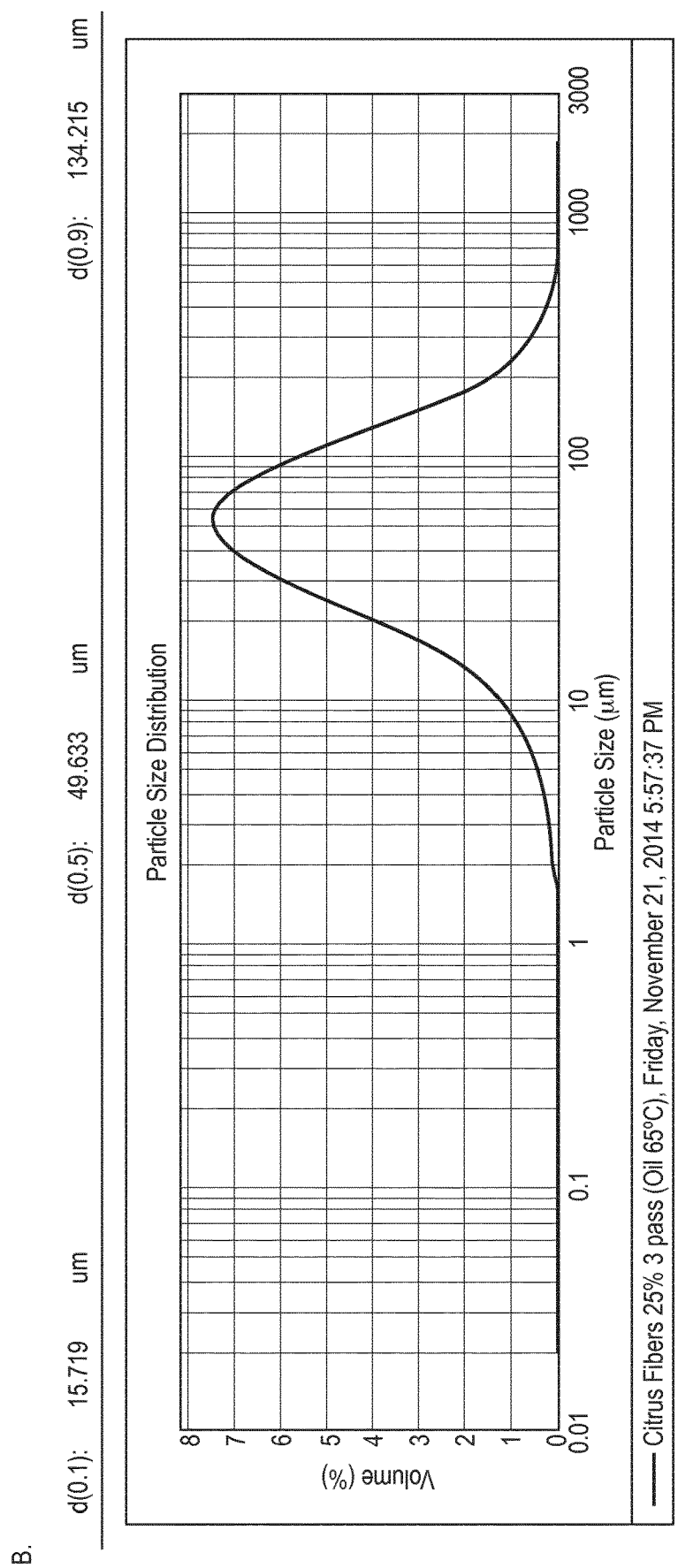

A reference RTD beverage at equal composition was prepared, where the citrus fibres were not added via the oil phase as described in the current invention, but mixed into the skim milk together with the sugar. The particle size distribution of the dry milled reference citrus fibre powder is shown in FIG. 3A. It is characterized by a $d_{90.3}$ of 202 µm.

Sedimentation Test

The beverage samples were poured into in a cup at T=25° C. The beverage was allowed a settling time of 5 minutes and the sedimentation test was done by measuring the mass of sediments in the cup on a submersed plate using a sedimentation balance: Mettler Toledo XP404S Excellence Plus with Density Determination Kit. Balance Link Software V 4.02. The cup with the immersed plate is shown in FIG. 4 A.

Results

Figure 1:
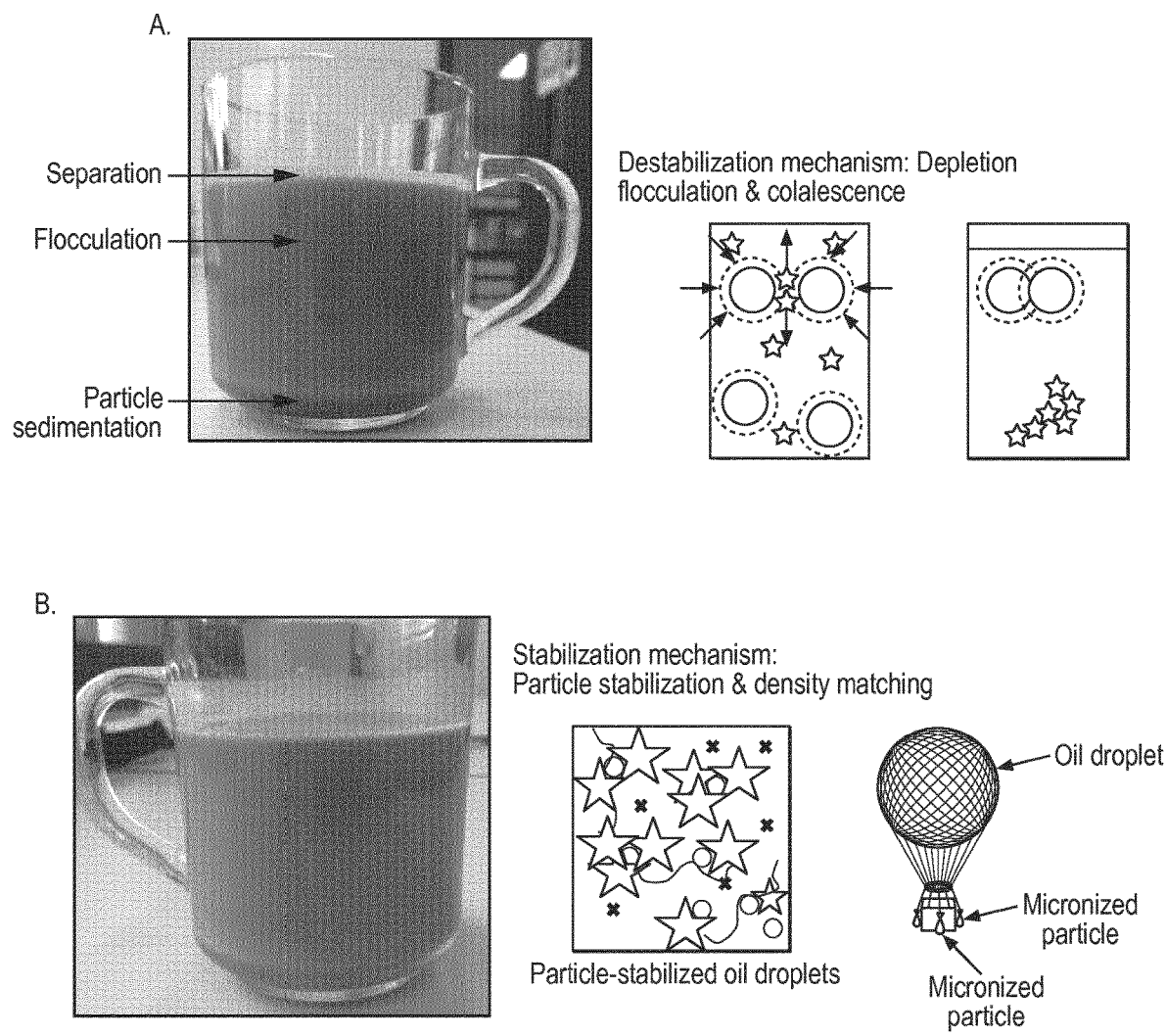
FIG. 1 shows a diagrammatic representation of the problem with methods illustrated in prior art such as dry mix grinding (A). This sample shows separation flocculation and sedimentation. While the sample of the present invention (B) shows a consistent uniform product which is achieved by encapsulating the OFC particles in oil and introducing this to the creamer component as described below. The rounded particles represent the oil droplets in the emulsion. If the emulsion is not stable, the droplets merge together.
Figure 2:
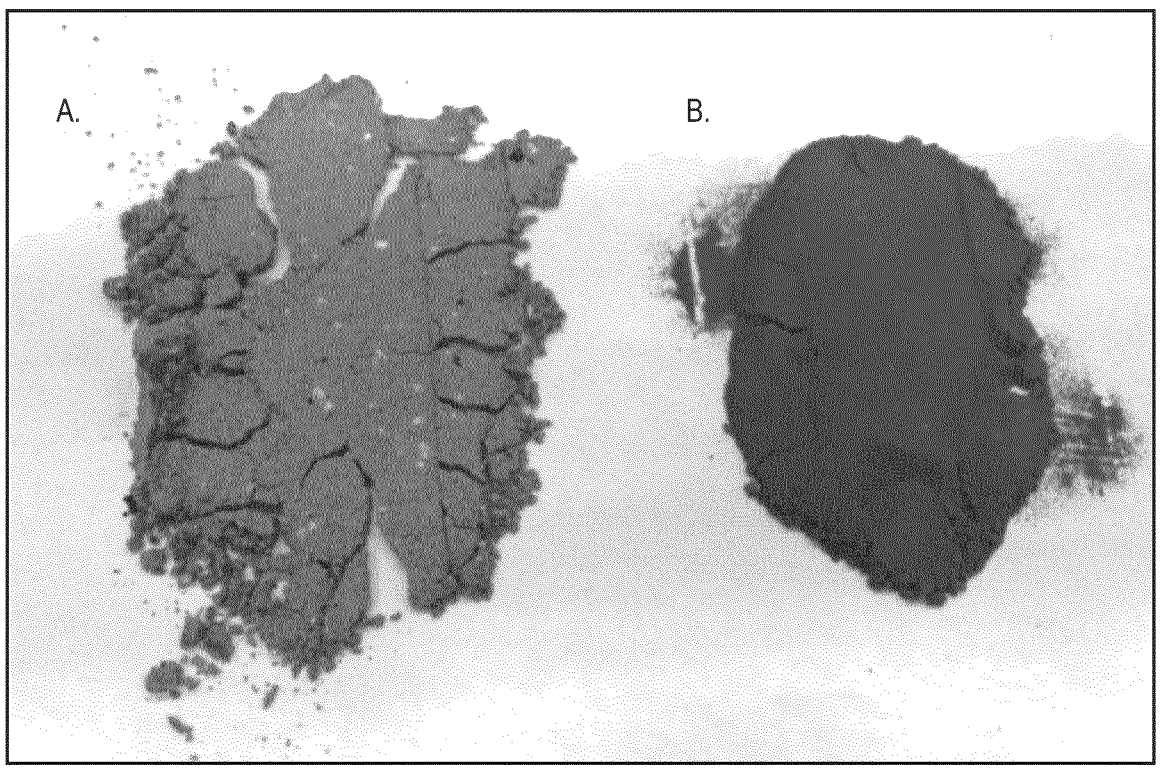
FIG. 2 show spray dried creamer powders containing micronized date pits. Sample A corresponds to the reference, obtained by dry mixing of milled date pit powder into the creamer preparation. Sample B corresponds to the current invention (date pits micronized in oil). At equal fat and date pit content, the reference sample is a dark grey colored substance while the sample of the invention is coffee colored. The use of such a compound is to provide coffee compositions in which coffee is mixed with roasted date pits. To create a unexpected nutty and creamy flavour in the coffee recipe
Figure 4:
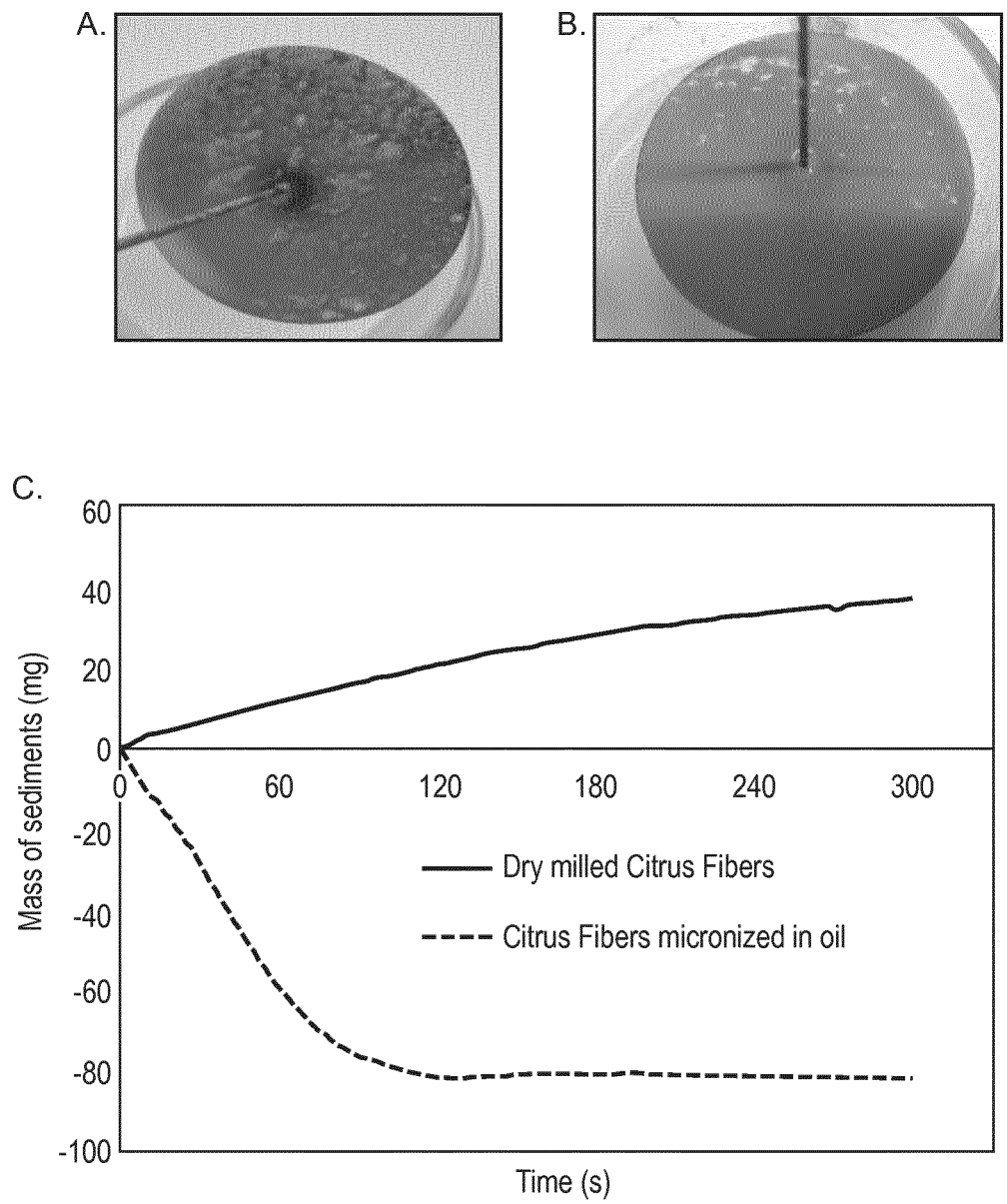
FIG. 4 shows result from the sedimentation balance characterizing an RTD beverage containing citrus fibres as oil filling compound. For the reference preparation a large amount of sediments is found on the suspended plate after 5 min. of sedimentation time (FIG. 4 A), whereas the sample produced according to the current invention at equal fibre content shows only very few sediments (FIG. 4 B). The evolution of the mass of sediments versus time is shown in FIG. 4 C for both samples.

Measurement of mass of sediments in the cup on submersed plate is shown on FIG. 4 B for the current invention and in FIG. 4 C for a reference RTD beverage with dry-milled citrus fibre pieces mixed into the preparation. Based on continuous and quantitative measurement of particle sedimentation in the cup with the help of the sedimentation balance, the stability of the dispersion of the micronized particles in the RTD beverage preparation can be evaluated. The result is presented in FIG. 4 D. While an increase of the sedimented citrus fibre particle mass for the reference sample (dispersion of dry milled citrus fibre particles into the RTD beverage preparation) is observed, the product according to the current invention (i.e. citrus fibres micronized in oil) does not settle within 5 min time. The mass on the sedimentation balance even decreases slightly, as some light particles move upwards, driven by buoyancy as illustrated in FIG. 1. Very few sediments are found on the immersed plate for the micronized citrus fibres in oil sample.

Example 2

Process for Providing a Creamer

Methods

Figure 5:
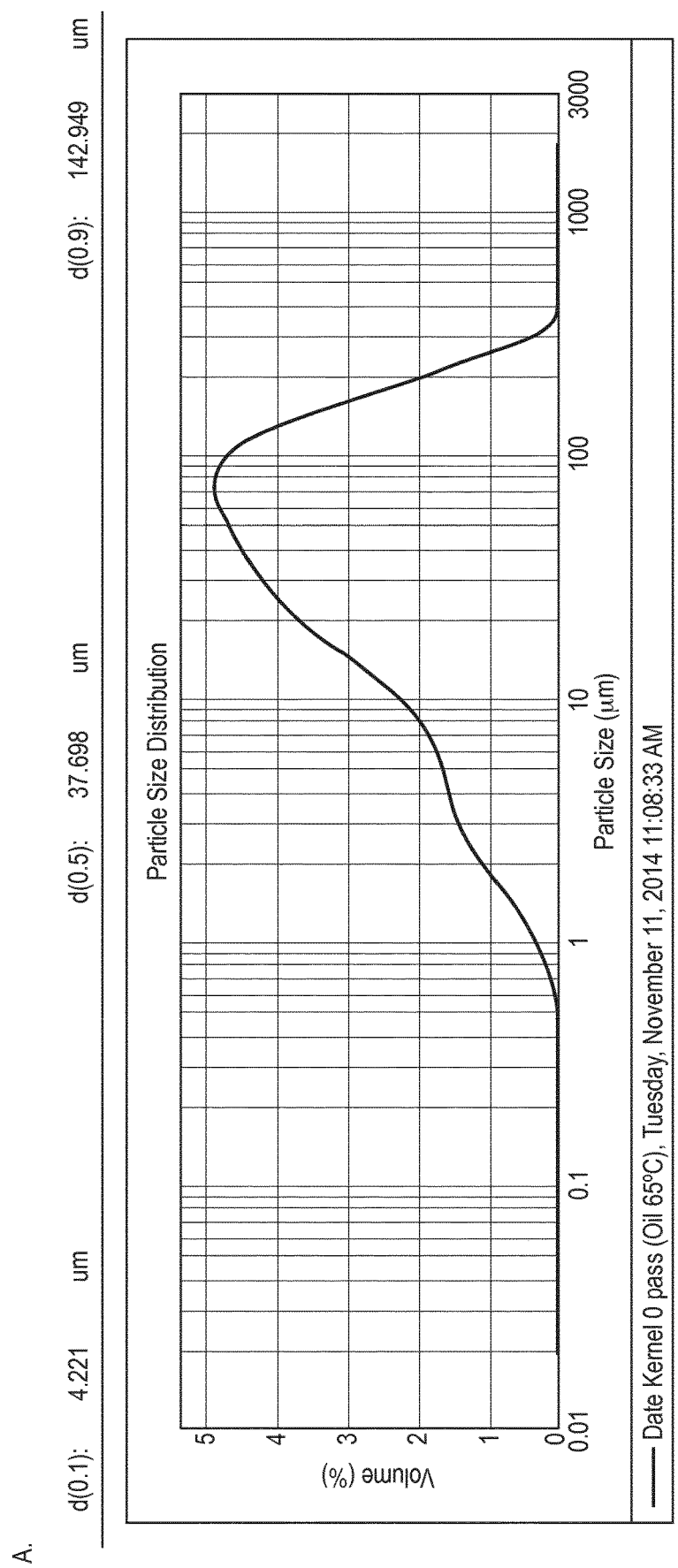
FIG. 5 shows the particle size distribution of powdered date kernel particles (FIG. 5A: dry milled powder, FIG. 5B: micronized date pits suspended in palm kernel oil after two passages through the wet bead mill).
Figure 5:
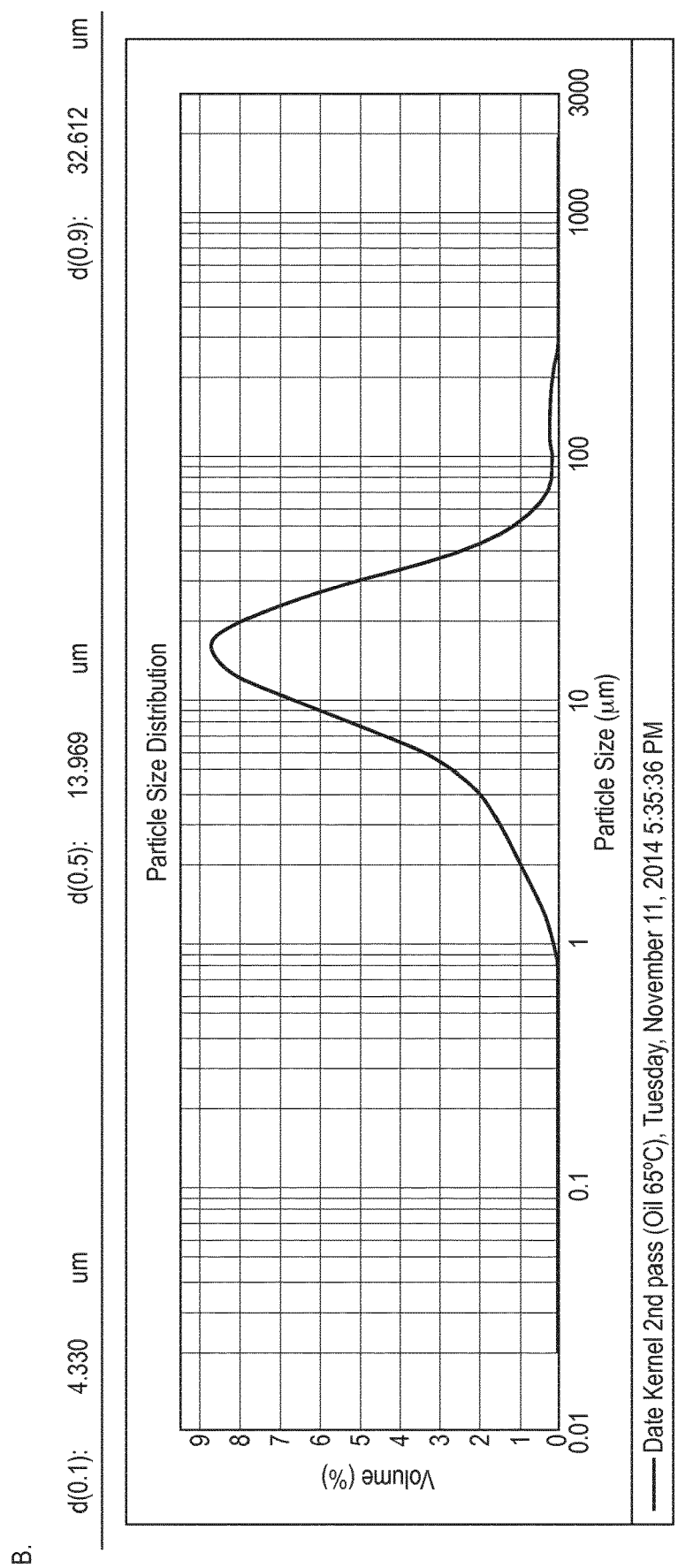

Powdered roasted date pits (particle size distribution given in FIG. 5A) were incorporated into palm kernel oil at 65° C. and mixed for 15 minutes until the date pits were fully dispersed. The dispersion of date pits in palm kernel oil is then micronized using a wet bead mill (Hosokawa Alpine Hydro-Mill 90 AHM, T=65° C., zirconium oxide bead 1.7/1.9 mm, 3000 RPM, TS50).

After two passages through the mill the size distribution of the micronized particles is characterized by a $d_{90.3}$ of 33 µm, i.e 90% of the mass belongs to particles with a diameter smaller than 33 micrometers. The particle size distribution of the date pit particles micronized in oil as described above is given in FIG. 5B.

The oil containing micronized date pits particles was then mixed with monoglyceride Dimodan™ and Panodan™ (Dupont). In parallel typical non-dairy creamer ingredients (sodium caseinate, dipotassium phosphate, sodium hexametaphosphate, trisodium citrate, and sodium chloride) were mixed in water and stirred in a vessel at 50° C.

These two mixes were then mixed and stirred at 50° C. with the addition of glucose syrup. The final mix was homogenized (APV-HTST) and pasteurized (APV-HTST at 85° C. during 5 sec). The pasteurized mix was then spray-dried (NIRO SD-6.3-N) at 160° C.

In this example, 28% of the final creamer dry weight is represented by date pit particles added via the oil phase.

Sensory Data

The sensory characteristics of date pits creamer composition were judged by sensory panellists. The creamer preparation according to the present invention (#292) was evaluated versus a reference sample (#645) at equal composition. For the reference sample date pits powder was added in a dry mixing step to a reference creamer preparation made with palm kernel oil (35%). Fat content and date pit content of both the reference and the creamer sample made according to the current invention are identical.

It was found by the panel that the composition of the present invention exhibited a smooth and stable suspension with enhanced almond flavor and aromas. Sedimentation was absent during consumption as described above. Detailed observations are represented in Table 4.

TABLE 4

Results of sensory evaluation.

| Sample | Appearance | Mouthfeel |
| --- | --- | --- |
| #292 Date Pits | Coffee color No sediment | Slightly grainy |

TABLE 4-continued

Results of sensory evaluation.

| Sample | Appearance | Mouthfeel |
|---|---|---|
| micronized in oil | Homogenous Cream layer on the surface | |
| #645 Dry micronized Date Pits | Grey color Sediments Oil at the surface | Extremely sandy |

Confocal Microscopy

Figure 6:
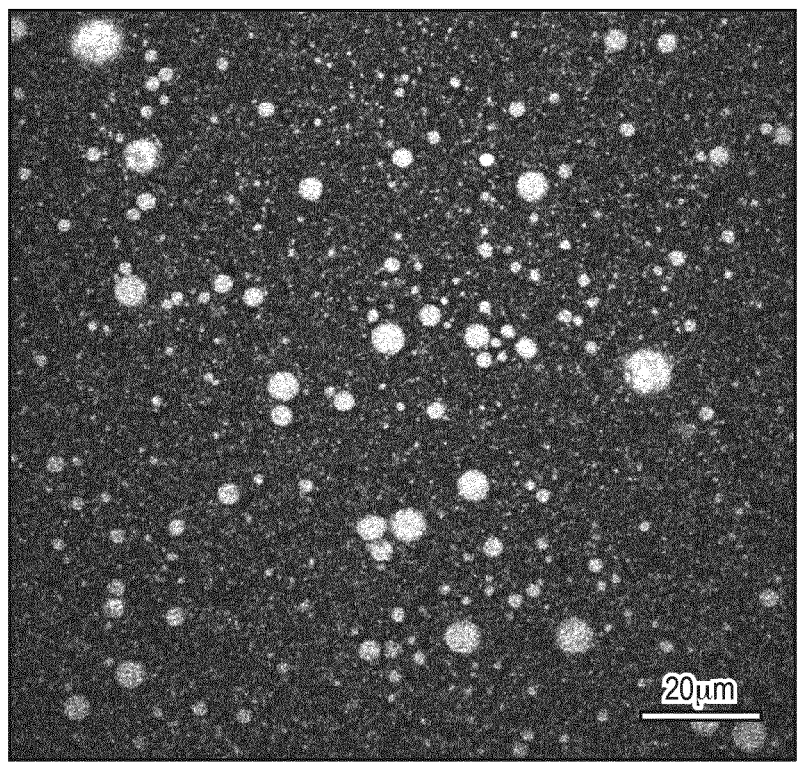
FIG. 6 shows confocal microscope images showing the interface of oil droplets (red) emulsified in water. 6A: Reference reconstituted creamer containing dry micronized date pit particles. No adsorption of particles on the oil-water interface can be seen. 6B: Reconstituted creamer made with date pit particles micronized in-oil. Aggregated structures of protein-rich particles absorbed at the oil-water interface, which stabilize the emulsion can be seen. Furthermore, date pit particles are found inside the oil droplets, therefore displacing and filling the oil droplets.
Figure 6:
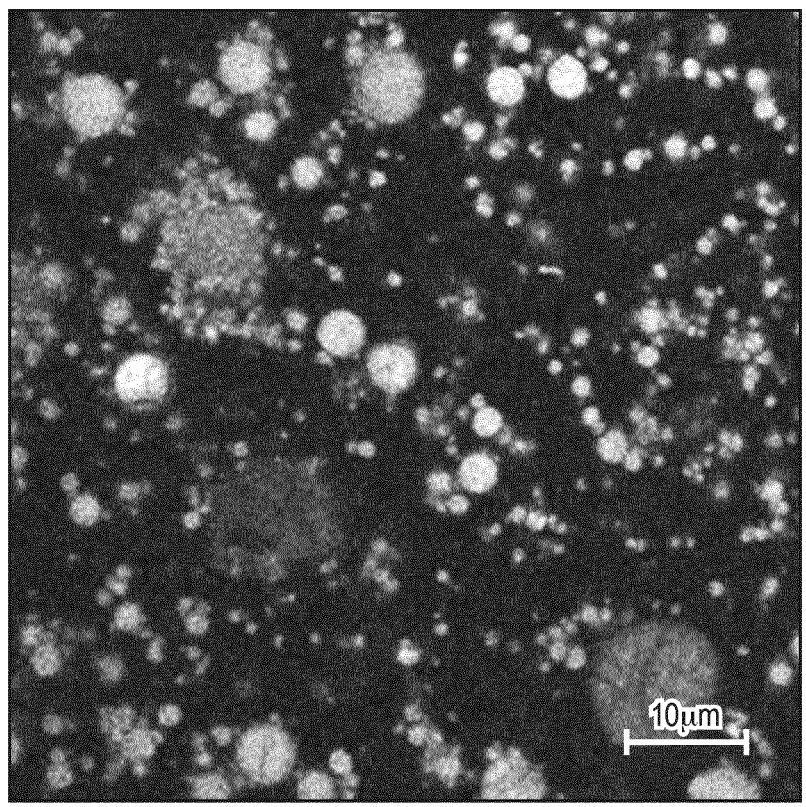

Samples of the RTD final beverage preparation were analysed under a confocal microscope (LSM710, Zeiss). Samples have been stained with:

Nile red (Sigma # Sigma N3013) for fat staining at 488 nm excitation wavelength Fast green FCF (Serva electrophoresis # SVA2129502) for protein staining at 633 nm excitation wavelength. $CaCO_3$ particles were imaged using the reflection mode at a 488 nm wavelength. Microscopy pictures of reconstituted liquid beverages are presented on FIG. 6. FIG. 6A shows a reference sample (dispersion of dry milled date pit particles into the creamer preparation), whereas FIG. 6B shows a liquid beverage sample containing date pit particles micronized in oil.

Microscopy Results

The confocal microscopy pictures presented on FIG. 6B show an intense signal next to the oil droplets surface when the particles have been milled in oil whereas no specific signal is observed in the case of the reference sample (FIG. 6A). The presence of the particles next to the oil/water interface contributes to a better stabilization of the beverages making the entity "in-oil micronized date pits particle attached to oil droplet" heavier (i.e. increase in density) than the single oil droplet and lighter than the particle itself (per unit volume). Under these conditions, oil covered micronized date pits particle sedimentation is prevented due to density matching. In addition, no visual flocculation of particles is observed.

Example 3

Process for Providing a Beverage Powder

Methods

Figure 7:
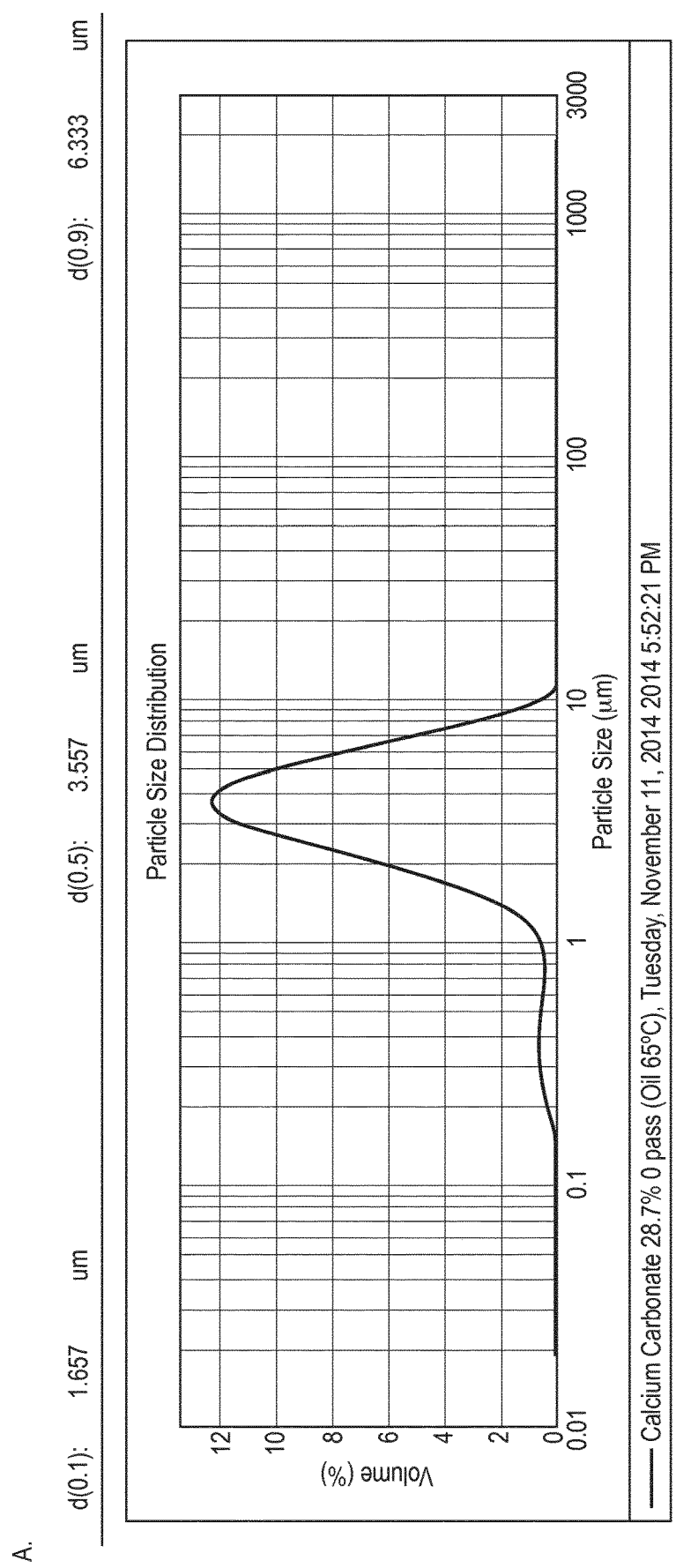
FIG. 7 shows the particle size distribution of powdered calcium carbonate (CaCO3) particles (FIG. 7A: dry micronized powder, FIG. 7B: micronized CaCO3 suspended in palm kernel oil after one passages through the wet bead mill).
Figure 7:
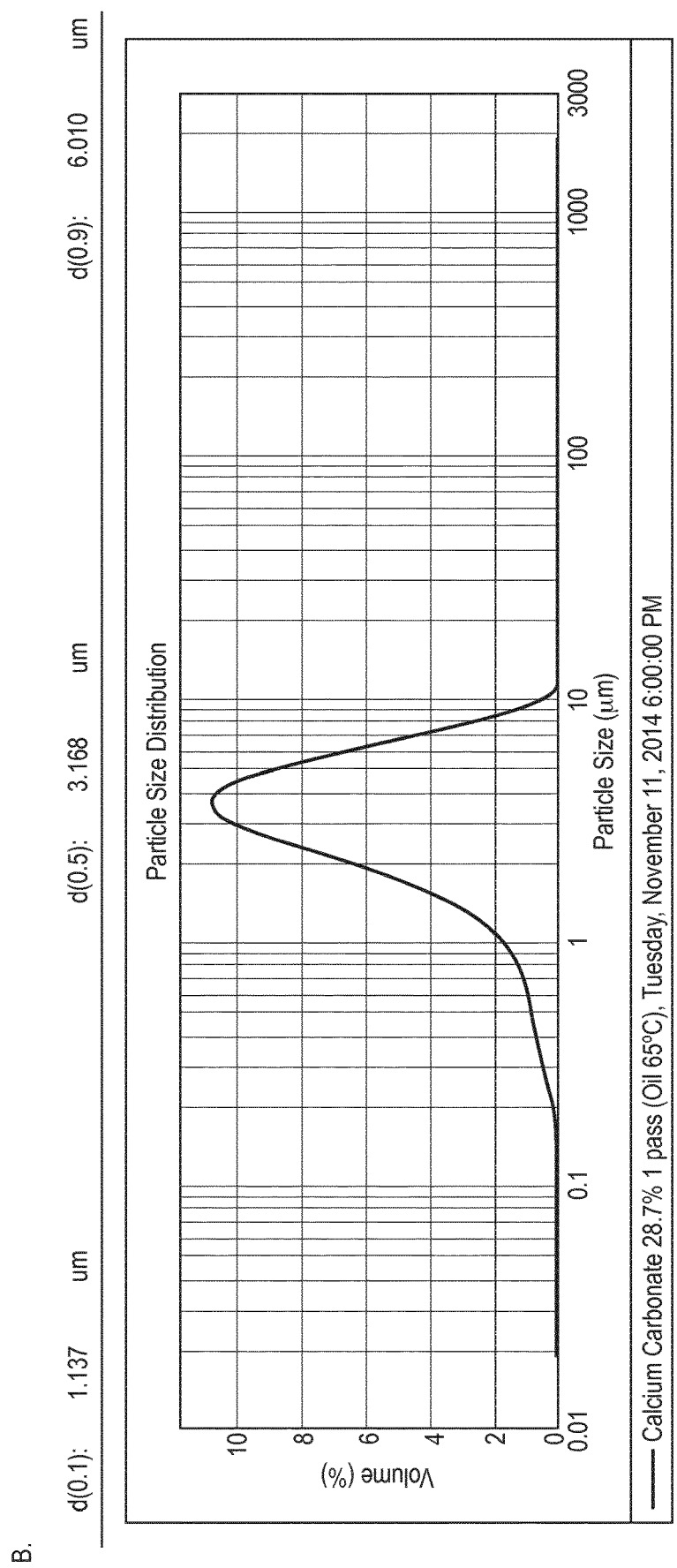

Calcium carbonate powder (particle size distribution given in FIG. 7A) was mixed into palm kernel oil at T=65° C. for 20 min until fully dispersed. This dispersion is then micronized using a wet bead mill (Hosokawa Alpine Hydro-Mill 90 AHM, T=65° C., zirconium oxide bead 1.7/1.9 mm, 3000 RPM, TS 28.7).

After one pass through the mill the size distribution of the micronized particles is characterized by a $d_{90.3}$ of 6.0 µm, i.e 90% of the mass belongs to particles with a diameter smaller than 6.0 micrometers. The corresponding particle size distribution is given in FIG. 7B.

The oil containing micronized calcium carbonate particles was then mixed with monoglyceride Dimodan™ and Panodan™ (Dupont). In parallel typical non-dairy creamer ingredients (sodium caseinate, dipotassium phosphate, sodium hexametaphosphate, trisodium citrate, and sodium chloride) were mixed in water and stirred in a vessel at 50° C. These two mixes were then mixed and stirred at 50° C. with the addition of glucose syrup. The final mix was homogenized (APV®-HTST) and pasteurized (APV®-HTST at 85° C. during 5 sec). The pasteurized mix was then spray-dried (NIRO SD-6.3-N) at 160° C.

In this example, 5% of the final creamer dry weight is represented by calcium carbonate particles added via the oil phase.

The obtained creamer powder is used as an ingredient in a powdered beverage preparation. For this purpose, the creamer powder containing micronized calcium carbonate is dry mixed with sugar and soluble coffee powder. A typical beverage powder composition comprises 35% creamer with calcium carbonate, 12% soluble coffee and 53% sugar. The calcium carbonate represents 5% of the creamer powder mass or (i.e. 1.75% of the final beverage powder mass). The obtained powder is filled in sachets and provides an instant coffee beverage upon reconstitution with hot water. In another use the described powdered beverage preparation is filled into capsules and provides a coffee beverage upon reconstitution with the help of a beverage system such as Nescafe Dolce Gusto.

Dissolution Kinetics Analysis

The term "dissolution" refers to the reconstitution of the beverage powder in a liquid. The term t90 refers to the time taken for 90% weight of the powder to be dissolved in a liquid. This time t90 can measured accurately by means of electrical conductivity, i.e using the device Metrohm module 856. A water bath is kept at constant temperature. The conductivity probe is introduced into the liquid and kept, until a steady state electrical conductivity is measured. Adding powder into the liquid starts the measurement. Stirring can be applied with the help of a magnetic stirrer. Ions released upon dissolution of the tablet increase the electrical conductivity of the medium. By dissolving the tablet completely, a plateau of the electrical conductivity is reached. The time t90 is defined as the point of time, when 90% of the total conductivity transition from the initial to the final steady state value is reached. For more details consult the Metrohm user manual: http://partners.metrohm.com/GetDocument?action=get_dms_document&docid=1432097

Results

A glass beaker containing 400 ml water was kept at 80° C. The beaker was equipped with an electrical conductivity probe and a magnetic stirrer turning at 250 RPM. A portion of 7 g of the beverage powder according to Example 3 was dosed into the beaker and the conductivity measurement was started. The evolution of the electrical conductivity, which is proportional to the amount of solid dissolved, was monitored for 600s. Typically a plateau is formed after 50-100 s, indicating complete dissolution.

For comparison, a reference sample was produced containing the same amount of calcium carbonate powder and possessing the same overall fat content, where the calcium carbonate is incorporated as dry mix into the beverage powder composition. The same dissolution test was performed using the reference powder.

Figure 8:
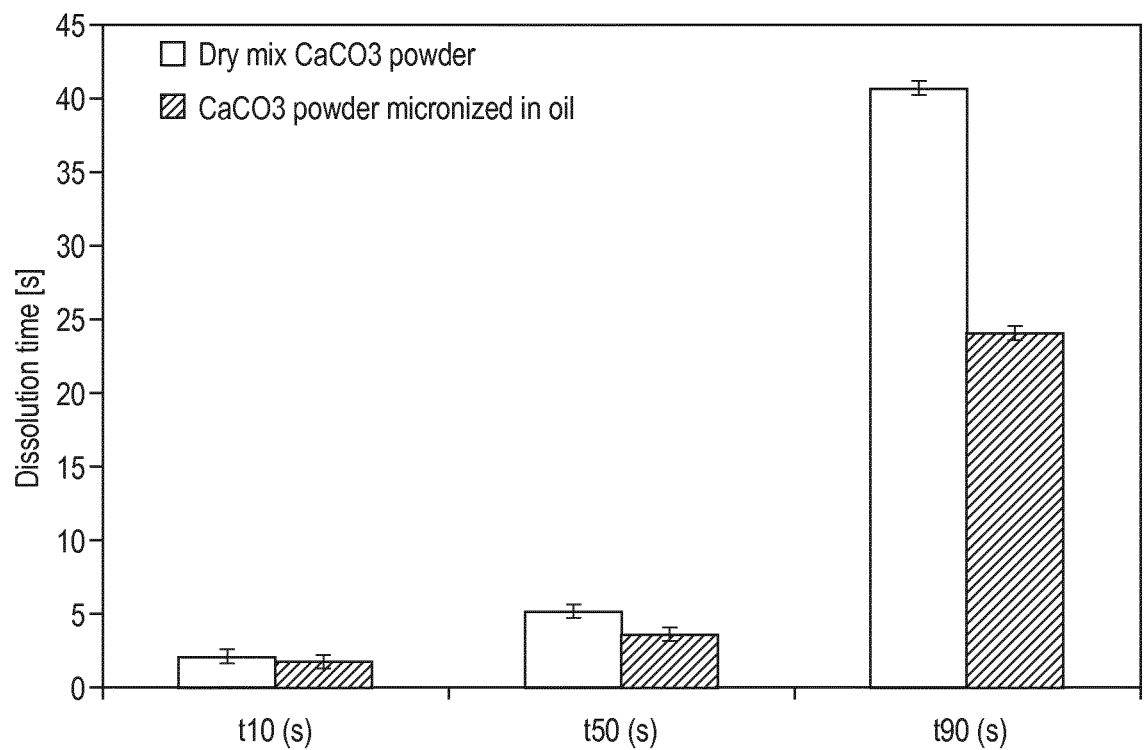
FIG. 8 shows a comparison of the dissolution kinetics of a reference beverage powder containing micronized CaCO3 powder added in a dry mixing step to the preparation and a beverage powder produced according to the current invention (CaCO3 micronized in oil). It can be seen that wettability and reconstitution kinetics are significantly improved for the product of the current invention.

The time points where 10%, 50% and 90% respectively of the conductivity change from the start to the steady state value were reached are represented in FIG. 8 for both the reference sample and the beverage powder containing cocoa micronized in oil.

It can be seen from the results that the incorporation of calcium carbonate micronized in oil into the creamer matrix brings a significant benefit in terms of dissolution kinetics over a beverage powder preparation containing dry mixed calcium carbonate powder at equal calcium carbonate and fat content.

Microscopy Results

Figure 9:
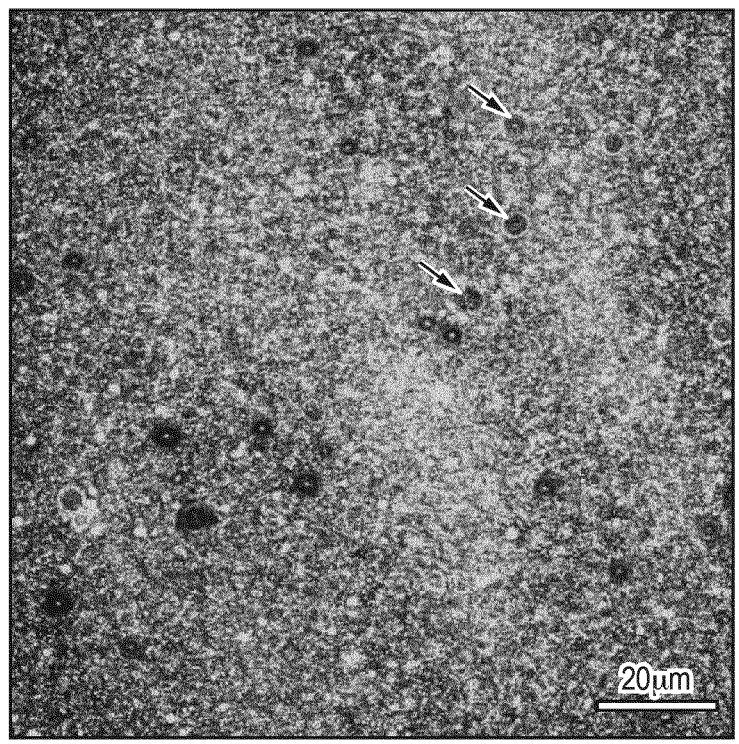
FIG. 9: Confocal microscopic image of a Reconstituted creamer made with CaCO3 particles micronized in-oil, where the interface between oil droplets and water is stabilized by adsorbed particles (shown in white on the figure). Black arrows point a CaCO3 particle surrounding the oil droplet.
Figure 10:
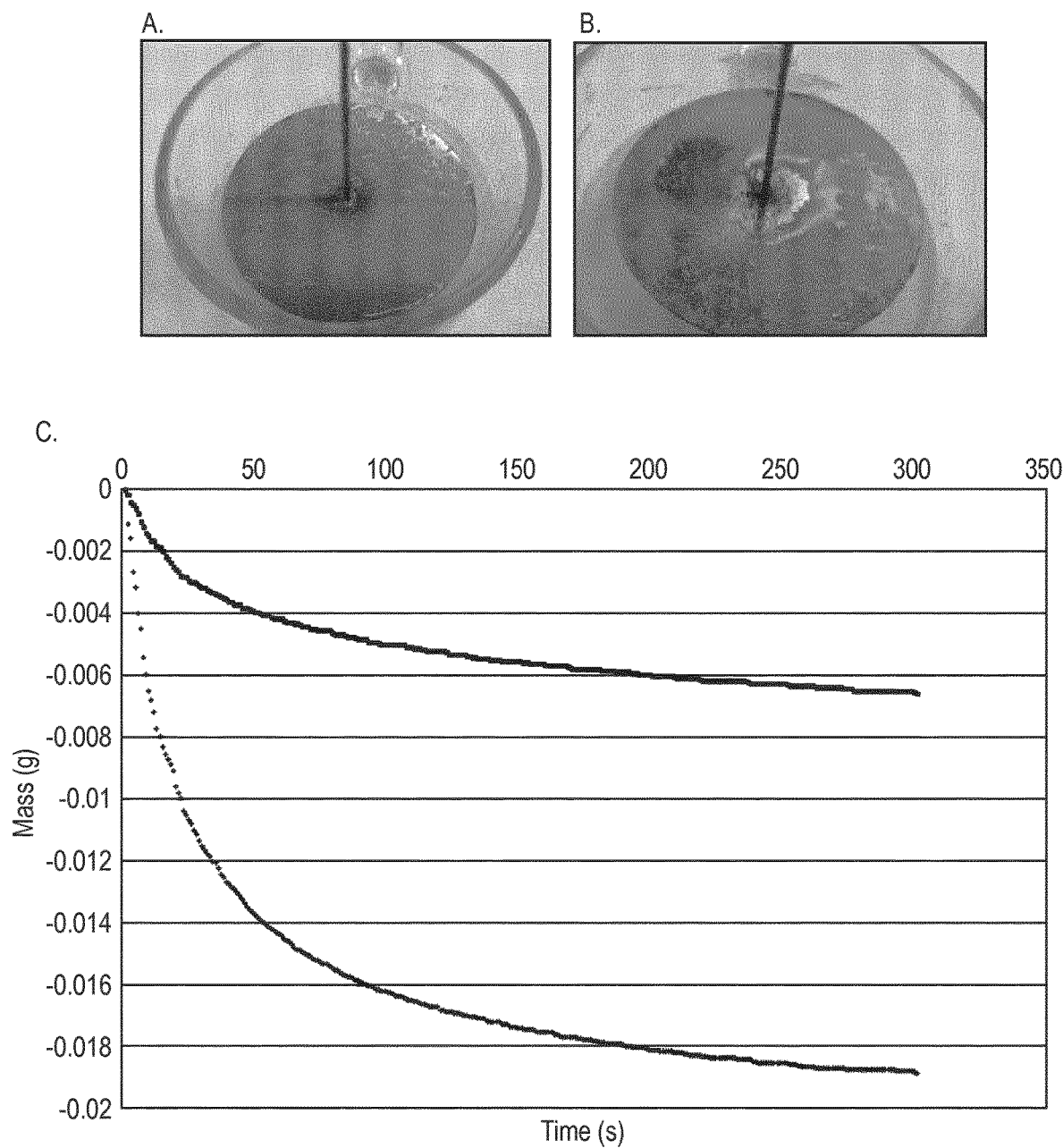
FIG. 10 shows result from the sedimentation balance characterizing an RTD beverage containing xanthan as oil filling compound. For the reference preparation a large amount of sediments is found on the suspended plate after 5 min. of sedimentation time (FIG. 10 A), whereas the sample produced according to the current invention at equal xanthan content shows only very few sediments (FIG. 10 B). The evolution of the mass of sediments versus time is shown in FIG. 10 C for both samples.

The confocal microscopy pictures presented on FIG. 9 show an intense signal next to the oil droplets surface when the particles have been milled in oil whereas no specific signal is observed in the case of the reference sample. The presence of the particles next to the oil/water interface (shown in white on the figure) contributes to a better stabilization of the beverages making the entity "in-oil micronized $CaCO_3$ particle attached to oil droplet" heavier (i.e. increase in density) than the single oil droplet and lighter than the particle itself (per unit volume). Black arrows point at such spots, were a halo can be seen around the oil droplet. In these conditions, oil covered micronized $CaCO_3$ particle sedimentation is prevented due to density match. In addition, no visual flocculation of particles is observed.

Example 4

Process for Providing a Creamer
Methods

Xanthan powder was incorporated into palm kernel oil at 65° C. and mixed for 15 minutes until the xanthan was fully dispersed. The dispersion of xanthan in palm kernel oil is then micronized using a wet bead mill (Hosokawa Alpine Hydro-Mill 90 AHM, T=65° C., zirconium oxide bead 1.7/1.9 mm, 3000 RPM, TS33).

After one passage through the mill the size distribution of the micronized particles is characterized by a $d_{90.3}$ of 80 µm, i.e 90% of the mass belongs to particles with a diameter smaller than 80 micrometers. The particle size distribution of xanthan micronized in oil was found to be 80.631 µm (d(0.9)) while the particle size distribution of xanthan as purchased from the supplier was found to be 199.317 µm (d(0.9)).

The oil containing micronized xanthan particles was then mixed with monoglyceride Dimodan™ and Panodan™ (Dupont). In parallel typical non-dairy creamer ingredients (sodium caseinate, dipotassium phosphate, sodium hexametaphosphate, trisodium citrate, and sodium chloride) were mixed in water and stirred in a vessel at 50° C.

These two mixes were then mixed and stirred at 50° C. with the addition of glucose syrup. The final mix was homogenized (APV-HTST) and pasteurized (APV-HTST at 85° C. during 5 sec). The pasteurized mix was then spray-dried (NIRO SD-6.3-N) at 160° C.

In this example, 0.9% of the final creamer dry weight is represented by xanthan particles added via the oil phase.

Microscopy Results

Figure 11:
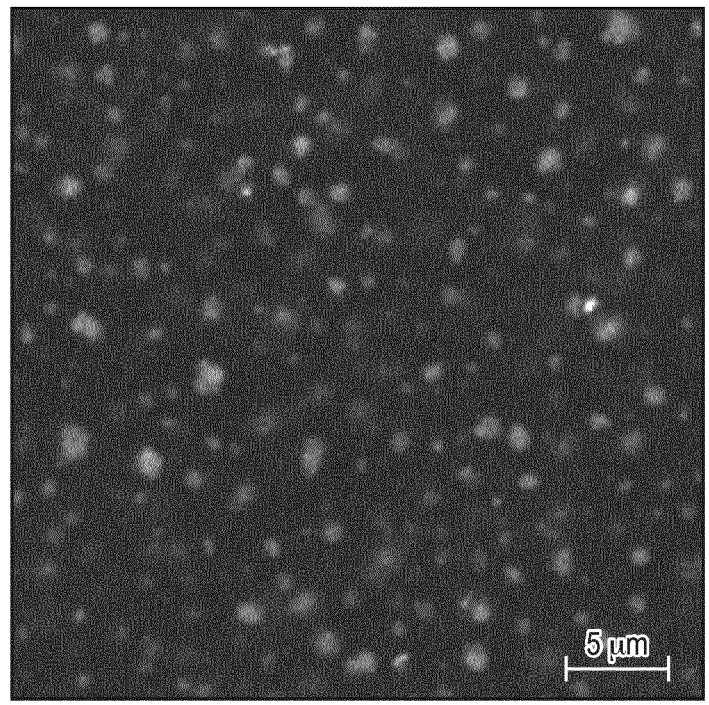
FIG. 11: Confocal microscopic image of 11A: Reference RTD beverage with non-micronized xanthan particles where the interface between oil droplets and water is stabilized by adsorbed particles (shown in white on the figure); 11B: RTD beverage with micronized xanthan particles a White arrows point a xanthan particle surrounding the oil droplet.
Figure 11:
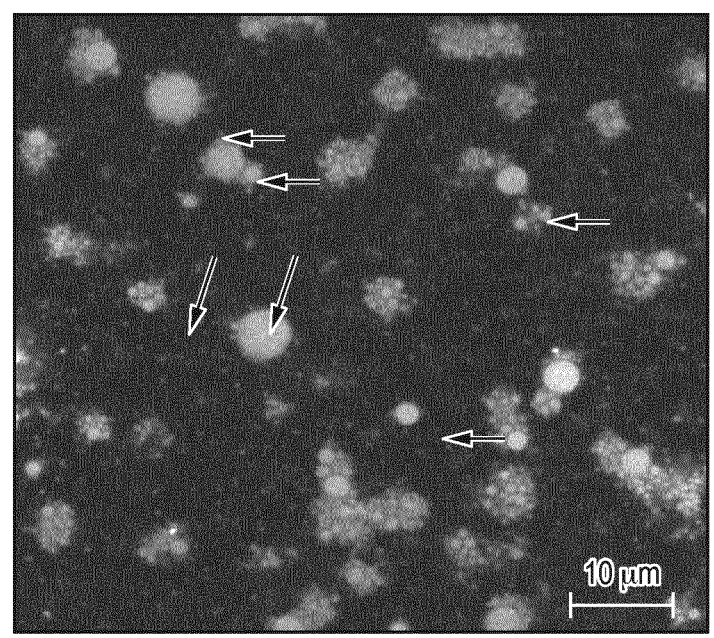

The confocal microscopy pictures presented on FIG. 11B show an intense signal next to the oil droplets surface when the particles have been milled in oil whereas no specific signal is observed in the case of the reference sample (FIG. 11A). The presence of the particles next to the oil/water interface contributes to a better stabilization of the beverages making the entity "in-oil micronized xanthan particle attached to oil droplet" heavier (i.e. increase in density) than the single oil droplet and lighter than the particle itself (per unit volume). In these conditions, oil covered micronized xanthan particle sedimentation is prevented due to density match.

Example 5

Process for Providing a Creamer as Ingredient for a Beverage Powder
Methods

Figure 12:
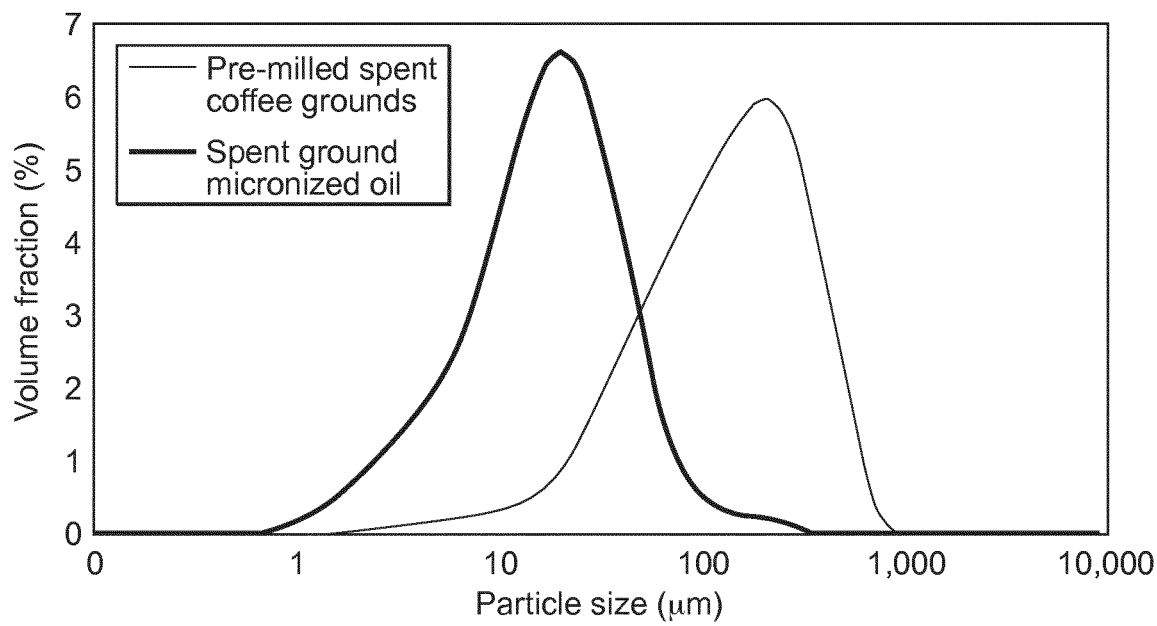
FIG. 12 shows the particle size distribution of spent coffee grounds: pre-milled dry spent coffee ground (Ditting coffee grinder), micronized spent coffee grounds suspended in palm kernel oil after three passages through the wet bead mill.

Pre-milled spent coffee grounds (particle size distribution given in FIG. 12) were incorporated into palm kernel oil at 65° C. and mixed for 15 minutes until the spent coffee grounds were fully dispersed. The dispersion of spent coffee grounds in palm kernel oil is then micronized using a wet bead mill (Hosokawa Alpine Hydro-Mill 90 AHM, T=65° C., zirconium oxide bead 1.7/1.9 mm, 2700 RPM, TS33).

After three passages through the mill the size distribution of the micronized particles is characterized by a $d_{90.3}$ of 51 µm, i.e 90% of the mass belongs to particles with a diameter smaller than 51 micrometers. The particle size distribution of the spent coffee grounds particles micronized in oil as described above is given in FIG. 12

The oil containing micronized spent coffee grounds particles was then mixed with monoglyceride Dimodan™ and Panodan™ (Dupont). In parallel typical non-dairy creamer ingredients (sodium caseinate, dipotassium phosphate, sodium hexametaphosphate, trisodium citrate, and sodium chloride) were mixed in water and stirred in a vessel at 50° C. These two mixes were then mixed and stirred at 50° C. with the addition of glucose syrup. The final mix was homogenized (APV-HTST) and pasteurized (APV-HTST at 85° C. during 5 sec). The pasteurized mix was then spray-dried (NIRO SD-6.3-N) at 160° C.

In this example, 18% of the final creamer dry weight is represented by spent coffee grounds particles added via the oil phase.

The obtained creamer powder is used as an ingredient in a powdered beverage preparation. For this purpose, the creamer powder containing micronized spent coffee grounds is dry mixed with sugar and soluble coffee powder. A typical beverage powder composition comprises 35% creamer with spent coffee grounds, 12% soluble coffee and 53% sugar.

The spent coffee grounds represent 18% of the creamer powder mass or (i.e. 6.3% of the final beverage powder mass). The obtained powder is filled in sachets and provides an instant coffee beverage upon reconstitution with hot water. In another use the described powdered beverage preparation is filled into capsules and provides a coffee beverage upon reconstitution with the help of a beverage system such as Nescafe Dolce Gusto.

Sensory Data

The sensory characteristics of the thus obtained powdered beverage preparation were judged by sensory panellists. The powdered beverage preparation according to the present invention (#144) was evaluated versus a reference sample (#566) at equal composition. For the reference sample spent coffee grounds powder was added in a dry mixing step to a reference powdered beverage preparation made with creamer containing palm kernel oil without OFC (35%). Fat content and spent coffee grounds content of both the reference and the powdered beverage preparation sample made using the current invention are identical.

Figure 13:
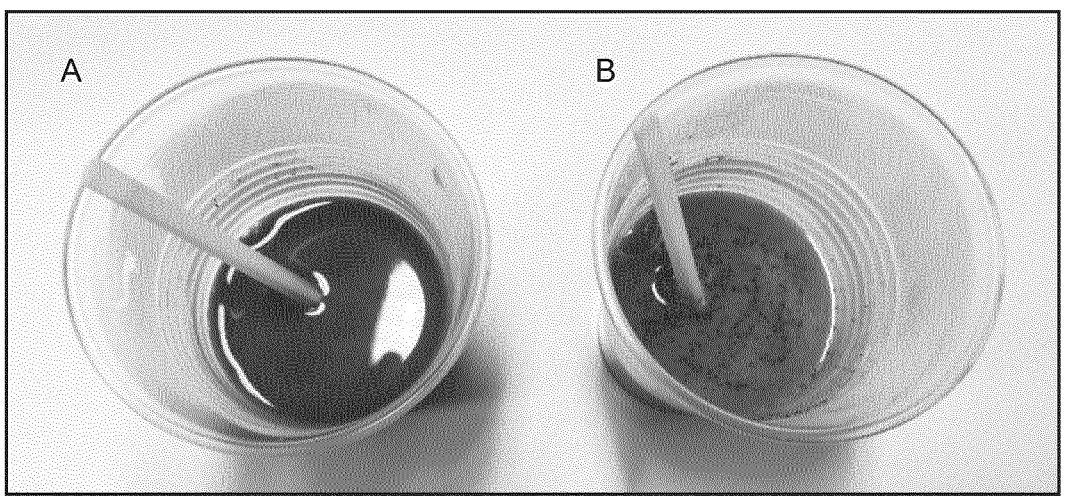
FIG. 13 shows spray dried creamer powders reconstituted in hot water (85° C.) containing micronized spent coffee grounds.

It was found by the panel that the composition of the present invention exhibited a smooth and stable suspension with enhanced sweet malty flavor and aromas. Sedimentation was absent during consumption as described above. Detailed observations are represented in Table 5 and FIG. 13.

TABLE 5

Results of sensory evaluation.

| Sample | Appearance | Mouthfeel |
|---|---|---|
| #144 Powdered beverage preparation with | Dark brown color No sediment Homogenous | Smooth Full Creamy |

TABLE 5-continued

Results of sensory evaluation.

| Sample | Appearance | Mouthfeel |
| --- | --- | --- |
| creamer containing spent coffee grounds based on invention | (compare FIG. 13, Sample A) | |
| #566 Powdered beverage preparation with creamer dry mixed with spent coffee grounds | Light brown colour Dark lumps Immediate sedimentation (compare FIG. 13, Sample B) | Watery/thin with lumps |

Example 6

Process for Providing a Creamer as Ingredient for a Beverage Powder

Methods

Pre-milled rice bran (particle size distribution given in FIG. 14) was incorporated into palm kernel oil at 65° C. and mixed for 15 minutes until the rice bran was fully dispersed. The dispersion of rice bran in palm kernel oil is then micronized using a wet bead mill (Hosokawa Alpine Hydro-Mill 90 AHM, T=65° C., zirconium oxide bead 1.7/1.9 mm, 2700 RPM, TS20).

After three passages through the mill the size distribution of the micronized particles is characterized by a $d_{90.3}$ of 86 µm, i.e 90% of the mass belongs to particles with a diameter smaller than 86 micrometers. The particle size distribution of the rice bran particles micronized in oil as described above is given in FIG. 14

The oil containing micronized rice bran particles was then mixed with monoglyceride Dimodan™ and Panodan™ (Dupont). In parallel typical non-dairy creamer ingredients (sodium caseinate, dipotassium phosphate, sodium hexametaphosphate, trisodium citrate, and sodium chloride) were mixed in water and stirred in a vessel at 50° C.

These two mixes were then mixed and stirred at 50° C. with the addition of glucose syrup. The final mix was homogenized (APV-HTST) and pasteurized (APV-HTST at 85° C. during 5 sec). The pasteurized mix was then spray-dried (NIRO SD-6.3-N) at 160° C.

In this example, 10% of the final creamer dry weight is represented by rice bran particles added via the oil phase.

The obtained creamer powder is used as an ingredient in a powdered beverage preparation. For this purpose, the creamer powder containing micronized spent coffee grounds is dry mixed with sugar and soluble coffee powder. A typical beverage powder composition comprises 35% creamer with rice bran, 12% soluble coffee and 53% sugar. The micronized rice bran represent 10% of the creamer powder mass or (i.e. 3.5% of the final beverage powder mass). The obtained powder is filled in sachets and provides an instant coffee beverage upon reconstitution with hot water. In another use the described powdered beverage preparation is filled into capsules and provides a coffee beverage upon reconstitution with the help of a beverage system such as Nescafe Dolce Gusto.

The invention claimed is:

1. A process for providing an oil filler composition (OFC), the process comprising:
   a) mixing in a first mixing step an oil component comprising oil-filler compounds (OFC) in oil and grinding the oil component to provide a first composition comprising micronized OFC particles with an average particle size below 100 micrometers (µm) in the oil, the OFC comprising a substance selected from the group consisting of dietary fibers, hydrocolloids, inorganic salts, and combinations thereof;
   b) providing an aqueous component comprising a protein selected from the group consisting of a milk protein, a plant protein, and combinations thereof to provide a second composition;
   c) mixing in a second mixing step the first composition with the second composition to provide a mixture;
   d) homogenizing the mixture to provide an oil-in-water emulsion; and
   e) drying the oil-in-water emulsion.

2. The process of claim 1, wherein the protein comprised in the second composition comprises sodium caseinate.

3. The process according to claim 1 comprising adding a bulking agent and/or a sweetener agent to the oil-in-water emulsion; and
   pasteurizing or commercially sterilizing the oil-in-water emulsion.

4. The process according to claim 3, wherein the bulking agent comprises maltodextrin, and the sweetener agent comprises a sugar or a combination of carbohydrates.

5. A process for providing an oil filler composition, the process comprising:
   a) mixing in a first mixing step an oil component comprising oil-filler compounds (OFC) in oil and grinding the oil component to provide a first composition comprising micronized OFC particles with an average particle size below 100 micrometers (µm) in the oil, the OFC comprising a substance selected from the group consisting of dietary fibers, hydrocolloids, inorganic salts, and combinations thereof;
   b) providing an aqueous component comprising a protein selected from the group consisting of a milk protein, a plant protein, and combinations thereof to provide a second composition;
   c) mixing in a second mixing step the first composition with the second composition to provide a mixture;
   d) homogenizing the mixture to provide an oil-in-water emulsion by a high temperature short time (HTST) or ultra-high temperature (UHT) treatment using a direct or indirect process; and
   e) filling the oil filler composition on a clean fill, ultra clean fill (ESL) or aseptic filler.

6. The process according to claim 1 comprising adding one or more emulsifiers in a step selected from the group consisting of
   step a) to the first composition;
   step b) to the aqueous component;
   step c);
   step d); and
   combinations thereof.

7. The process according to claim 1, wherein the protein in the aqueous component of step b) is selected from the group consisting of skim milk solids, caseinate, whey protein, and combinations thereof.

8. The process according to claim 1, wherein the mixture obtained in step c) comprises at least 5% (w/w) of the oil component comprising the micronized OFC particles.

9. The process according to claim 1, wherein the mixture obtained in step c) comprises
   5-50% (w/w) of the oil component comprising the micronized OFC particles, wherein the micronized OFC particles constitute 2.5-70% of the total weight of the oil component comprising the micronized OFC particles;

1-50% (w/w) of the protein; and 5-70% (w/w) of a sugar source.

10. An OFC composition obtainable according to the process of claim 1.

11. The process of claim 9, wherein the protein comprises sodium caseinate.

12. The process of claim 5, wherein the protein in the second composition comprises sodium caseinate.

13. The process of claim 5 comprising adding a bulking agent and/or a sweetener agent to the oil-in-water emulsion; and pasteurizing or commercially sterilizing the oil-in-water emulsion.

14. The process of claim 13, wherein the bulking agent comprises maltodextrin, and the sweetener agent comprises a sugar or a combination of carbohydrates.

15. The process of claim 5 comprising drying the oil-in-water emulsion.

16. The process of claim 5, wherein the mixture obtained in step c) comprises 5-50% (w/w) of the oil component comprising the micronized OFC particles, wherein the micronized OFC particles constitute 2.5-70% of the total weight of the oil component comprising the micronized OFC particles;

1-50% (w/w) of the protein; and 5-70% (w/w) of a sugar source.

\* \* \* \* \*

UNITED STATES PATENT AND TRADEMARK OFFICE
CERTIFICATE OF CORRECTION

PATENT NO. : 10,645,957 B2
APPLICATION NO. : 15/538539
DATED : May 12, 2020
INVENTOR(S) : Martin Leser et al.

Page 1 of 1

It is certified that error appears in the above-identified patent and that said Letters Patent is hereby corrected as shown below:

On the Title Page

The Inventor Names (72) reading "Stephan Palzer" should be changed to --Stefan Palzer-- and "Gerhand Niederreiter" should be changed to --Gerhard Niederreiter--

Signed and Sealed this
Thirtieth Day of June, 2020

Andrei Iancu
*Director of the United States Patent and Trademark Office*